United States Patent
Kishida et al.

(10) Patent No.: US 8,443,173 B2
(45) Date of Patent: May 14, 2013

(54) METHOD FOR INSTRUCTING A DATA PROCESSOR TO PROCESS DATA

(75) Inventors: Takeshi Kishida, Osaka (JP); Masaitsu Nakajima, Osaka (JP)

(73) Assignee: Panasonic Corporation, Osaka (JP)

( * ) Notice: Subject to any disclaimer, the term of this patent is extended or adjusted under 35 U.S.C. 154(b) by 96 days.

(21) Appl. No.: 13/153,035

(22) Filed: Jun. 3, 2011

(65) Prior Publication Data

US 2011/0307686 A1    Dec. 15, 2011

Related U.S. Application Data

(60) Division of application No. 12/632,532, filed on Dec. 7, 2009, now Pat. No. 7,979,676, which is a continuation of application No. 11/706,333, filed on Feb. 15, 2007, now Pat. No. 7,664,934, which is a continuation of application No. 10/385,854, filed on Mar. 12, 2003, now Pat. No. 7,194,602, which is a continuation of application No. 09/761,177, filed on Jan. 18, 2001, now Pat. No. 6,549,999, which is a continuation of application No. 09/267,135, filed on Mar. 11, 1999, now Pat. No. 6,199,155.

(30) Foreign Application Priority Data

Mar. 11, 1998  (JP) .................... 10-059680
Apr. 24, 1998  (JP) .................... 10-115588

(51) Int. Cl.
*G06F 9/30*    (2006.01)
(52) U.S. Cl.
USPC .......................... 712/210; 712/208
(58) Field of Classification Search .......... 712/208, 712/209, 210
See application file for complete search history.

(56) References Cited

U.S. PATENT DOCUMENTS 4,398,245 A    8/1983  Fujita
4,616,313 A *  10/1986 Aoyagi .................... 712/212

(Continued)

FOREIGN PATENT DOCUMENTS

EP    0 425 410    5/1991
EP    0 426 393    5/1991

(Continued)

OTHER PUBLICATIONS

"Addressing a Second Page of Registers Without Increasing the Register Field Length," IBM Technical Disclosure Bulletin, vol. 16, No. 3 (Aug. 1973), pp. 771-772.

(Continued)

*Primary Examiner* — Aimee Li
(74) *Attorney, Agent, or Firm* — McDermott Will & Emery LLP

(57)    ABSTRACT

A data processor which executes instructions described in first and second instruction formats. The first instruction format defines a register-addressing field of a predetermined size, while the second instruction format defines a register-addressing field of a size larger than that of the register-addressing field defined by the first instruction format. The data processor includes: instruction-type identifier, responsive to an instruction, for identifying the received instruction as being described in the first or second instruction format by the instruction itself; a first register file including a plurality of registers; and a second register file also including a plurality of registers, the number of the registers included in the second register file being larger than that of the registers included in the first register file.

3 Claims, 16 Drawing Sheets

U.S. PATENT DOCUMENTS

| | | | |
|---|---|---|---|
| 4,733,344 A * | 3/1988 | Watanabe et al. | 712/205 |
| 4,847,759 A | 7/1989 | Oklobdzija | |
| 4,992,934 A * | 2/1991 | Portanova et al. | 712/209 |
| 5,001,702 A * | 3/1991 | Teraslinna et al. | 370/392 |
| 5,179,691 A | 1/1993 | O'Brien et al. | |
| 5,233,696 A * | 8/1993 | Suzuki | 712/204 |
| 5,313,644 A | 5/1994 | Matsuo et al. | |
| 5,440,701 A | 8/1995 | Matsuzaki et al. | |
| 5,513,363 A | 4/1996 | Kumar et al. | |
| 5,542,059 A * | 7/1996 | Blomgren | 712/41 |
| 5,740,461 A | 4/1998 | Jaggar | |
| 5,751,991 A | 5/1998 | Leach et al. | |
| 5,845,307 A | 12/1998 | Prabhu et al. | |
| 5,935,240 A * | 8/1999 | Mennemeier et al. | 712/225 |
| 6,157,996 A * | 12/2000 | Christie et al. | 712/218 |
| 6,199,155 B1 | 3/2001 | Kishida et al. | |
| 6,279,102 B1 * | 8/2001 | Morrison | 712/216 |
| 6,549,999 B2 | 4/2003 | Kishida et al. | |

FOREIGN PATENT DOCUMENTS

| | | |
|---|---|---|
| EP | 0483967 | 5/1992 |
| JP | 58-051353 A | 3/1983 |
| JP | 64-048132 A | 2/1989 |
| JP | 02-293932 | 12/1990 |
| JP | 3-147021 A | 6/1991 |
| JP | 3-150633 A | 6/1991 |
| JP | 5-46383 | 2/1993 |
| JP | 05-204635 A | 8/1993 |
| JP | 7-175651 A | 7/1995 |
| JP | 8-286911 A | 11/1996 |
| JP | 09-026878 | 1/1997 |
| JP | 9-512651 | 12/1997 |
| WO | WO 97/22924 | 6/1997 |
| WO | WO 97/48041 | 12/1997 |

OTHER PUBLICATIONS

"The Hardware Architecture of the Crisp Microprocessor," by Ditzel et al., The 14th Annual International Symposium on Computer Architecture (Jun. 1987), pp. 309-319.

(ARM Thumb) An Introduction to Thumb™, Mar. 1995, Version 2.0, ARM DVI-0001A, pp. 1-26.

United States Notice of Allowance issued in U.S. Appl. No. 12/632,532, mailed Mar. 3, 2011.

United States Notice of Allowance issued in U.S. Appl. No. 11/706,333, mailed Oct. 8, 2009.

United States Notice of Allowance issued in U.S. Appl. No. 10/385,854, mailed Dec. 15, 2006.

United States Notice of Allowance issued in U.S. Appl. No. 09/761,177, mailed Nov. 15, 2002.

United States Notice of Allowance issued in U.S. Appl. No. 09/267,135, mailed Sep. 22, 2000.

* cited by examiner

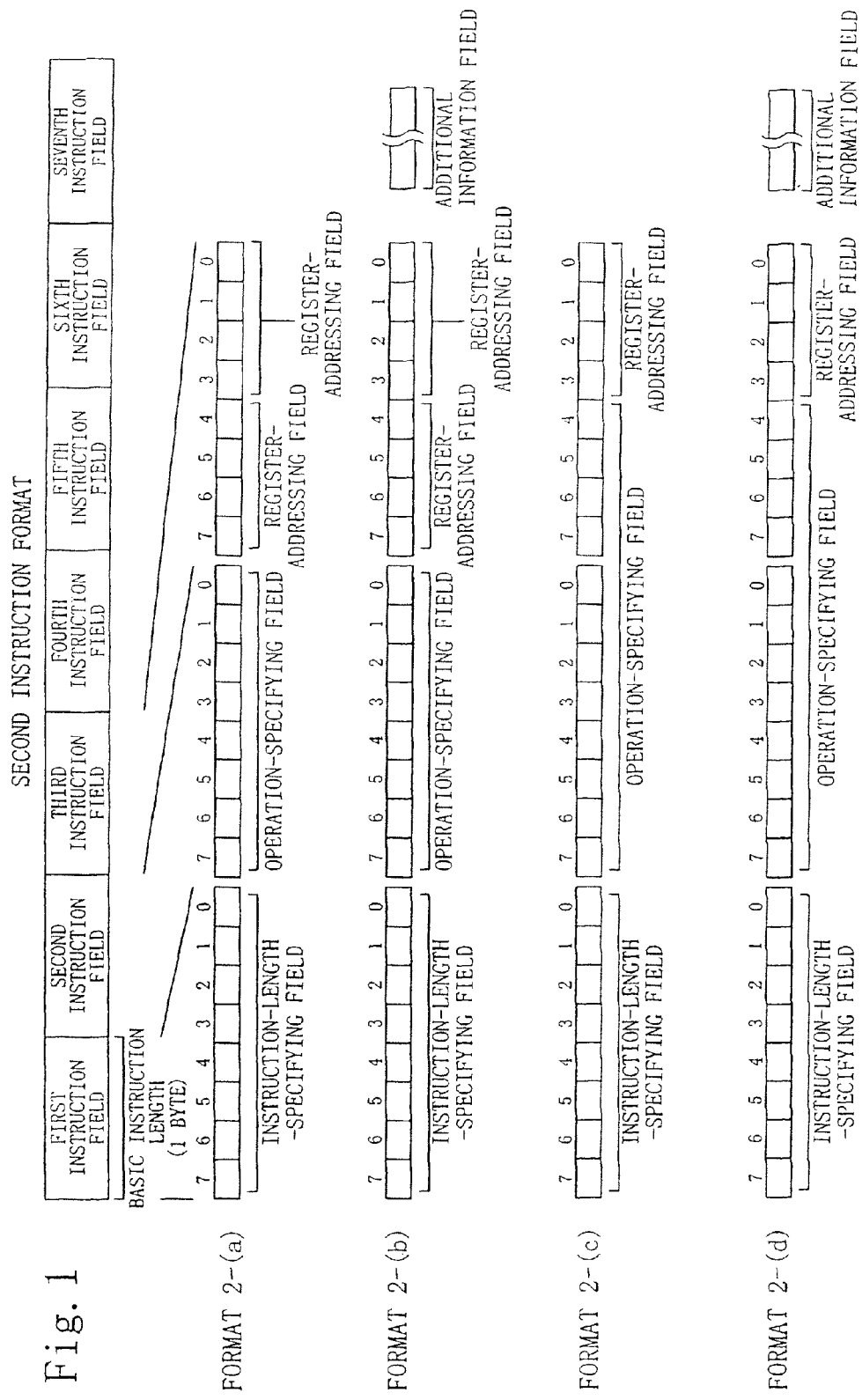

Fig. 2

SECOND INSTRUCTION FORMAT (a)
  ADD Rm, Rn     : ADD
  SUB Rm, Rn     : SUBTRACT
  CMP Rm, Rn     : COMPARE
  MOV(Rm), Rn    : TRANSFER FROM MEMORY TO REGISTER (LOAD)
  MOV Rm, (Rn)   : TRANSFER FROM REGISTER TO MEMORY (STORE)
  MOV Rm, Rn     : TRANSFER FROM REGISTER TO REGISTER
  ...

SECOND INSTRUCTION FORMAT (b)
  ADD Rm, Rn, Rd  : ADD
  SUB Rm, Rn, Rd  : SUBTRACT
  MOV(Ri, Rm), Rn : TRANSFER FROM MEMORY TO REGISTER (LOAD)
  ...              INDIRECTLY BY WAY OF INDEXED REGISTER

SECOND INSTRUCTION FORMAT (c)
  ...

SECOND INSTRUCTION FORMAT (d)
  ADD imm 16, Rn   : ADD 16-BIT IMMEDIATE VALUE
  ADD imm 16, Rn   : ADD 16-BIT IMMEDIATE VALUE
  MOV(disp8, SP), Rn : TRANSFER FROM MEMORY TO REGISTER (LOAD)
                    BY ADDRESSING USING STACK POINTER (SP) WITH DISPLACEMENT
  MOV Rm, (disp8, SP): TRANSFER FROM REGISTER TO MEMORY (STORE)
  ...                  BY ADDRESSING USING STACK POINTER (SP) WITH DISPLACEMENT

Fig. 4

THIRD INSTRUCTION FORMAT (a)
ADD_ADD  Rm1, Rn1, Rm2, Rn2     : ADD BETWEEN REGISTERS AND ADD BETWEEN REGISTERS IN PARALLEL
SUB_ASL  Rm1, Rn1, Rm2, Rn2     : SUBTRACT BETWEEN REGISTERS AND SHIFT BETWEEN REGISTERS IN PARALLEL
...

THIRD INSTRUCTION FORMAT (b)
ADD_ADD  imm4, Rn1, Rm2, Rn2    : ADD IMMEDIATE VALUE TO REGISTER AND ADD BETWEEN REGISTERS IN PARALLEL
SUB_ASL  imm4, Rn1, Rm2, Rn2    : SUBTRACT IMMEDIATE VALUE FROM REGISTER AND SHIFT BETWEEN REGISTERS IN PARALLEL
...

THIRD INSTRUCTION FORMAT (c)
ADD_ADD  Rm1, Rn1, imm4, Rn2    : ADD BETWEEN REGISTERS AND ADD IMMEDIATE VALUE TO REGISTER IN PARALLEL
DMACH_SUB Rm1, Rn1, imm4, Rn2   : MULTIPLY AND ACCUMULATE HALF-WORD BETWEEN REGISTERS AND
                                  SUBTRACT IMMEDIATE VALUE FROM REGISTER IN PARALLEL
...

THIRD INSTRUCTION FORMAT (d)
ADD_ADD  imm4, Rn1, imm4, Rn2   : ADD IMMEDIATE VALUE TO REGISTER AND ADD IMMEDIATE VALUE TO REGISTER IN PARALLEL
SUB_ADD  imm4, Rn1, imm4, Rn2   : SUBTRACT IMMEDIATE VALUE FROM REGISTER AND ADD IMMEDIATE VALUE TO REGISTER IN PARALLEL
...

THIRD INSTRUCTION FORMAT (e)
MOV_Lcc  (Rm+, imm4), Rn        : TRANSFER BETWEEN REGISTERS AND CONDITIONAL LOOP IN PARALLEL
...

| NAME OF REGISTER | BIT ASSIGNMENT ON INSTRUCTION CODE | NUMBER OF PHYSICAL REGISTER | NAME OF PHYSICAL REGISTER |
|---|---|---|---|
| A0 | 00 | 1000 | GENERAL-PURPOSE REGISTER |
| A1 | 01 | 1001 | GENERAL-PURPOSE REGISTER |
| A2 | 10 | 1010 | GENERAL-PURPOSE REGISTER |
| A3 | 11 | 1011 | GENERAL-PURPOSE REGISTER |
| D0 | 00 | 1100 | GENERAL-PURPOSE REGISTER |
| D1 | 01 | 1101 | GENERAL-PURPOSE REGISTER |
| D2 | 10 | 1110 | GENERAL-PURPOSE REGISTER |
| D3 | 11 | 1111 | GENERAL-PURPOSE REGISTER |
| E0 | | | |
| E1 | | | |
| E2 | | | |
| E3 | | | |
| E4 | | | |
| E5 | | | |
| E6 | | | |
| E7 | | | |

Fig. 8

| NAME OF REGISTER | BIT ASSIGNMENT ON INSTRUCTION CODE | NUMBER OF PHYSICAL REGISTER | NAME OF PHYSICAL REGISTER |
|---|---|---|---|
| A0 | 1000 | 1000 | GENERAL-PURPOSE REGISTER |
| A1 | 1001 | 1001 | GENERAL-PURPOSE REGISTER |
| A2 | 1010 | 1010 | GENERAL-PURPOSE REGISTER |
| A3 | 1011 | 1011 | GENERAL-PURPOSE REGISTER |
| D0 | 1100 | 1100 | GENERAL-PURPOSE REGISTER |
| D1 | 1101 | 1101 | GENERAL-PURPOSE REGISTER |
| D2 | 1110 | 1110 | GENERAL-PURPOSE REGISTER |
| D3 | 1111 | 1111 | GENERAL-PURPOSE REGISTER |
| E0 | 0000 | 0000 | GENERAL-PURPOSE REGISTER |
| E1 | 0001 | 0001 | GENERAL-PURPOSE REGISTER |
| E2 | 0010 | 0010 | GENERAL-PURPOSE REGISTER |
| E3 | 0011 | 0011 | GENERAL-PURPOSE REGISTER |
| E4 | 0100 | 0100 | GENERAL-PURPOSE REGISTER |
| E5 | 0101 | 0101 | GENERAL-PURPOSE REGISTER |
| E6 | 0110 | 0110 | GENERAL-PURPOSE REGISTER |
| E7 | 0111 | 0111 | GENERAL-PURPOSE REGISTER |

Fig. 9
```
...
a=a+b
c=c+d
...
```

Fig. 10
```
INSTRUCTION 1    ADD  D1,D0
INSTRUCTION 2    ADD  D2,D3
```

Fig. 11
```
INSTRUCTION 1    MOV(#4,SP),D0
INSTRUCTION 2    MOV(#8,SP),D1
INSTRUCTION 3    ADD  D1,D0
INSTRUCTION 4    MOV  D0,(#4,SP)
INSTRUCTION 5    MOV(#12,SP),D0
INSTRUCTION 6    MOV(#16,SP),D1
INSTRUCTION 7    ADD  D1,D0
INSTRUCTION 8    MOV  D0,(#12,SP)
```

Fig. 12
```
INSTRUCTION 1     MOV  D0,(#20,SP)
INSTRUCTION 2     MOV  D1,(#24,SP)
INSTRUCTION 3     MOV(#4,SP),D0
INSTRUCTION 4     MOV(#8,SP),D1
INSTRUCTION 5     ADD  D1,D0
INSTRUCTION 6     MOV  D0,(#4,SP)
INSTRUCTION 7     MOV(#12,SP),D0
INSTRUCTION 8     MOV(#16,SP),D1
INSTRUCTION 9     ADD  D1,D0
INSTRUCTION 10    MOV  D0,(#12,SP)
INSTRUCTION 11    MOV(#20,SP),D0
INSTRUCTION 12    MOV(#24,SP),D1
```

Fig. 13
```
INSTRUCTION 1    ADD  E1,E0
INSTRUCTION 2    ADD  E2,E3
```

Fig. 14

|  | LOOP |  | CODE SIZE(BYTE) |
|---|---|---|---|
| INSTRUCTION 1 | MOVH | D0, (#-6, A3) | 3 |
| INSTRUCTION 2 | SWHW | E0, E2 | 3 |
| INSTRUCTION 3 | MOVH | E2, (#-4, A3) | 4 |
| INSTRUCTION 4 | DMACH | E6, E1 | 3 |
| INSTRUCTION 5 | SUB | 1, E3 | 4 |
| INSTRUCTION 6 | MOV | (#4, E4+), E6 | 3 |
| INSTRUCTION 7 | MOV | (#4, E5+), E1 | 3 |
| INSTRUCTION 8 | LGE |  | 1 |

Fig. 15

|  | LOOP |  | CODE SIZE(BYTE) |
|---|---|---|---|
| INSTRUCTION 1 | MOVH | D0, (#-6, A3) | 3 |
| INSTRUCTION 2 | SWHW | E0, E2 | 3 |
| INSTRUCTION 3 | MOVH | E2, (#-4, A3) | 4 |
| INSTRUCTION 4 | DMACH_SUB | E6, E1, 1, E3 | 4 |
| INSTRUCTION 5 | MOV | (#4, E4+), E6 | 4 |
| INSTRUCTION 6 | MOV_LGE | (#4, E5+), E1 | 4 |

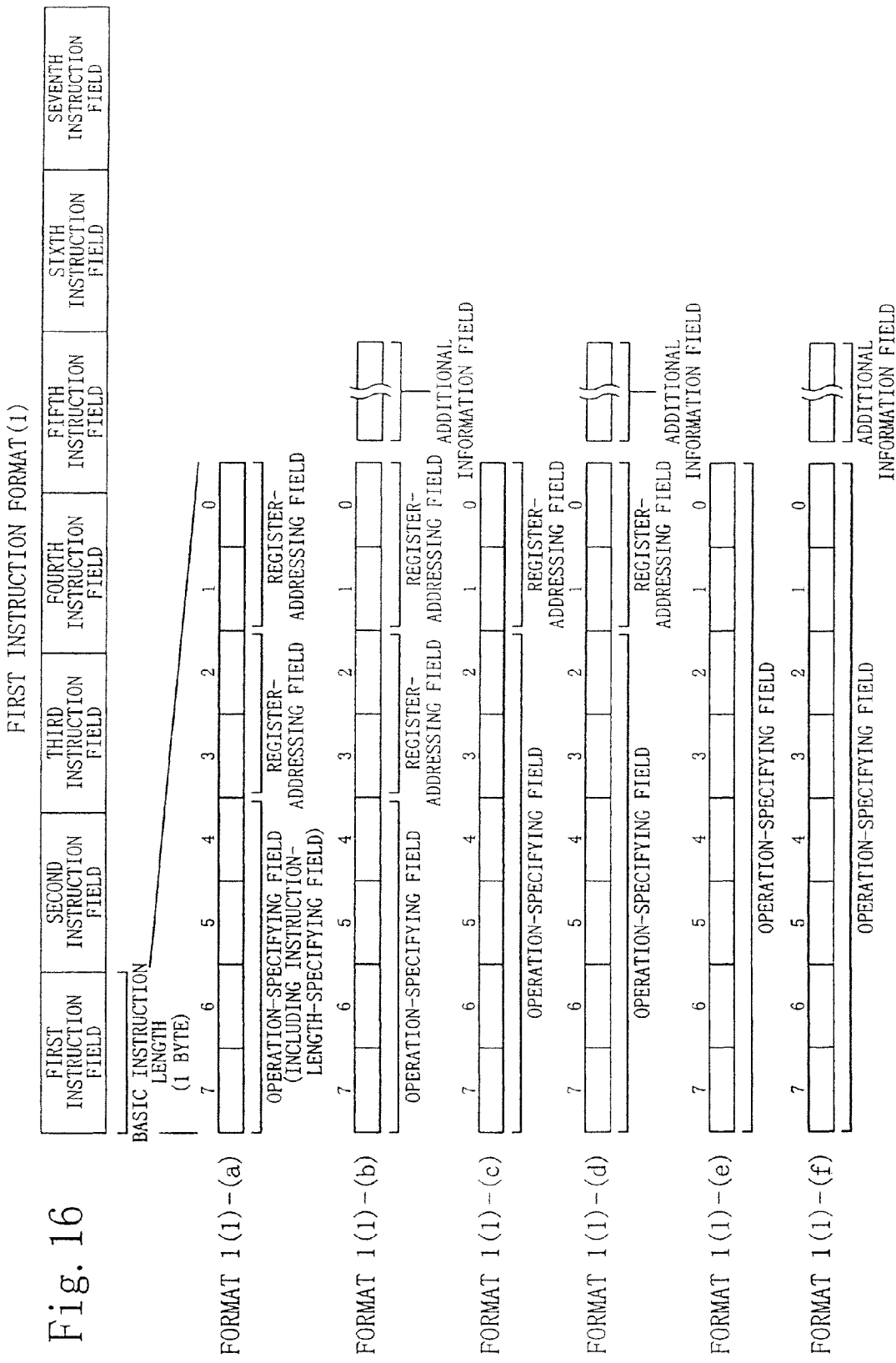

Fig. 17

FIRST INSTRUCTION FORMAT (1)-(a)
ADD  Dm, Dn        : ADD
CMP  Dm, Dn        : COMPARE
CMP  Am, An        : COMPARE
MOV  (Am), Dn      : TRANSFER FROM MEMORY TO REGISTER (LOAD)
MOV  Dm, (An)      : TRANSFER FROM REGISTER TO MEMORY (STORE)
MOV  Dm, Dn        : TRANSFER FROM REGISTER TO REGISTER
MOV  Am, An        : TRANSFER FROM REGISTER TO REGISTER
...

FIRST INSTRUCTION FORMAT (1)-(b)
CLR  Dm            : CLEAR DATA TO 0
INC  Dn            : INCREASE DATA BY 1
INC  Am            : INCREASE DATA BY 1
EXTB Dm            : EXTEND SIGNED BYTE DATA INTO WORD DATA
EXTUB Dm           : EXTEND UNSIGNED BYTE DATA INTO WORD DATA
EXTH Dm            : EXTEND SIGNED HALF-WORD DATA INTO WORD DATA
EXTHU Dm           : EXTEND UNSIGNED HALF-WORD DATA INTO WORD DATA
MOV  SP, An        : TRANSFER STACK POINTER (SP) TO REGISTER
...

FIRST INSTRUCTION FORMAT (1)-(c)
ADD  imm8, An           : ADD 8-BIT IMMEDIATE VALUE
ADD  imm8, Dn           : ADD 8-BIT IMMEDIATE VALUE
MOV  imm16, An          : TRANSFER 16-BIT IMMEDIATE VALUE
MOV  imm16, Dn          : TRANSFER 16-BIT IMMEDIATE VALUE
MOV  (abs16), Dn        : TRANSFER FROM MEMORY TO REGISTER (LOAD) BY ADDRESSING WITH 16-BIT ABSOLUTE VALUE
MOVBU (abs16), Dn       : TRANSFER ZERO-EXTENDED BYTE DATA FROM MEMORY TO REGISTER (LOAD)
                          BY ADDRESSING WITH 16-BIT ABSOLUTE VALUE
MOVHU (abs16), Dn       : TRANSFER ZERO-EXTENDED HALF-WORD DATA FROM MEMORY TO REGISTER (LOAD)
                          BY ADDRESSING WITH 16-BIT ABSOLUTE VALUE
MOV  Dm, (abs16)        : TRANSFER FROM REGISTER TO MEMORY (STORE) BY ADDRESSING WITH 16-BIT ABSOLUTE VALUE
MOVBU Dm, (abs16)       : TRANSFER ZERO-EXTENDED BYTE DATA FROM REGISTER TO MEMORY (STORE)
                          BY ADDRESSING WITH 16-BIT ABSOLUTE VALUE
MOVHU Dm (abs16)        : TRANSFER ZERO-EXTENDED HALF-WORD DATA FROM REGISTER TO MEMORY (STORE)
                          BY ADDRESSING WITH 16-BIT ABSOLUTE VALUE
MOV  (disp8, SP), An    : TRANSFER FROM MEMORY TO REGISTER (LOAD) BY ADDRESSING USING STACK POINTER (SP) WITH DISPLACEMENT
MOV  (disp8, SP), Dn    : TRANSFER FROM MEMORY TO REGISTER (LOAD) BY ADDRESSING USING STACK POINTER (SP) WITH DISPLACEMENT
MOV  An, (disp8, SP)    : TRANSFER FROM REGISTER TO MEMORY (STORE) BY ADDRESSING USING STACK POINTER (SP) WITH DISPLACEMENT
MOV  Dm, (disp8, SP)    : TRANSFER FROM REGISTER TO MEMORY (STORE) BY ADDRESSING USING STACK POINTER (SP) WITH DISPLACEMENT
...

FIRST INSTRUCTION FORMAT (1)-(e)
NOP                : NO OPERATION
LOOP #CC           : LOOP CONTROL INSTRUCTION

FIRST INSTRUCTION FORMAT (1)-(f)
BR #CC(disp8, PC)  : CONDITIONAL BRANCH OF PC WITH DISPLACEMENT
JMP (disp8, PC)    : UNCONDITIONAL BRANCH OF PC WITH DISPLACEMENT
...

Fig. 19

```
FIRST INSTRUCTION FORMAT (2)-(a)
  SUB Dm,Dn        : SUBTRACT
  MOV(Am),An       : TRANSFER FROM MEMORY TO REGISTER (LOAD)
  MOV Am,(An)      : TRANSFER FROM REGISTER TO MEMORY (STORE)
  ...

FIRST INSTRUCTION FORMAT (2)-(b)
  MOV(Ai,Dn),Dn    : TRANSFER FROM MEMORY TO REGISTER (LOAD)
  ...              INDIRECTLY BY WAY OF INDEXED REGISTER

FIRST INSTRUCTION FORMAT (2)-(c)
  ...

FIRST INSTRUCTION FORMAT (2)-(d)
  ADD imm16,An     : ADD 16-BIT IMMEDIATE VALUE
  ADD imm16,Dn     : ADD 16-BIT IMMEDIATE VALUE
  ...

FIRST INSTRUCTION FORMAT (2)-(e)
  RTI              : RETURN FROM INTERRUPT STATE
  ...

FIRST INSTRUCTION FORMAT (2)-(f)
  ...
```

| NAME OF REGISTER | BIT ASSIGNMENT ON INSTRUCTION CODE | NUMBER OF PHYSICAL REGISTER | NAME OF PHYSICAL REGISTER |
|---|---|---|---|
| A0 | 00 | 00 | ADDRESS REGISTER |
| A1 | 01 | 01 | ADDRESS REGISTER |
| A2 | 02 | 02 | ADDRESS REGISTER |
| A3 | 03 | 03 | ADDRESS REGISTER |
| D0 | 00 | 00 | ADDRESS REGISTER |
| D1 | 01 | 01 | ADDRESS REGISTER |
| D2 | 02 | 02 | ADDRESS REGISTER |
| D3 | 03 | 03 | ADDRESS REGISTER |

32 BITS

MIPS16

16 BITS

Fig. 24

| | | | | | | | | BIT CODES IN FIRST BYTE (HEXADECIMAL NUMBER) |
|---|---|---|---|---|---|---|---|---|
| FIRST INSTRUCTION FORMAT (1) | S0 | OP | | | | | | 00~EF |
| | S1 | OP | imm8/d8 | | | | | |
| | S2 | OP | imm16/d16/abs16 | | | | | |
| | S4 | OP | imm32/d32/abs32 | | | | | |
| | S6 | OP | imm48 | | | | | |
| FIRST INSTRUCTION FORMAT (2) | D0 | OP | OP | | | | | F0~F4, F6 |
| | D1 | OP | OP | imm8/d8 | | | | F8 |
| | D2 | OP | OP | imm16/d16/abs16 | | | | FA |
| | D4 | OP | OP | imm32/d32/abs32 | | | | FC |
| | D5 | OP | OP | imm40 | | | | F5 |
| SECOND INSTRUCTION FORMAT | T0 | OP | OP | OP | | | | F9 |
| | T1 | OP | OP | OP | imm8/d8 | | | FB |
| | T3 | OP | OP | OP | imm24/d24/abs24 | | | FD |
| | T4 | OP | OP | OP | imm32/d32/abs32 | | | FE |
| THIRD INSTRUCTION FORMAT | Q0 | OP | OP | OP | OP | | | F7 |

METHOD FOR INSTRUCTING A DATA PROCESSOR TO PROCESS DATA

RELATED APPLICATIONS

This application is a Divisional of U.S. application Ser. No. 12/632,532, filed on Dec. 7, 2009, now U.S. Pat. No. 7,979,676, which is a Continuation of U.S. application Ser. No. 11/706,333, filed on Feb. 15, 2007, now U.S. Pat. No. 7,664,934, which is a Continuation of application Ser. No. 10/385,854, filed on Mar. 12, 2003, now U.S. Pat. No. 7,194,602, which is a Continuation of application Ser. No. 09/761,177, filed on Jan. 18, 2001, now U.S. Pat. No. 6,549,999, which is a Continuation of application Ser. No. 09/267,135, filed on Mar. 11, 1999, now U.S. Pat. No. 6,199,155, claiming priority of Japanese Application Nos. 10-059680, filed on Mar. 11, 1998 and 10-115588, filed on Apr. 24, 1998, the entire contents of each of which are hereby incorporated by reference.

BACKGROUND OF THE INVENTION

The present invention relates to an improved data processor implemented as CPU or microprocessor, for example, and more particularly relates to a data processor adapted for use with an instruction set suitable for downsizing a program.

As semiconductor technologies and architecture of processors have been vigorously researched and developed over the past few years, the performance of programmable data processors of various types, termed "CPU's", have also been tremendously improved. Depending on their specific applications, CPU's may be roughly classified into the following two types: general-purpose microprocessors; and built-in microcontrollers for use in numerous kinds of control units and consumer electronics appliances. As for CPU's of the first type, that is, general-purpose microprocessors, improvement of performance is a top priority. Therefore, for the sake of improving the performance of general-purpose microprocessors, a wide variety of techniques have heretofore been employed. In contrast, with regards to built-in microcontrollers, it is true that improvement of performance is one of most significant objects to be achieved. What is more important is, however, striking an appropriate balance among performance improvement, cost effectiveness and reduction in power consumption. Among other things, the cost effectiveness plays a key role in meeting a high demand in consumer electronics applications.

There are two tips for realizing a CPU at a lower cost: reducing the size of a CPU itself (i.e., reducing the area of a CPU core); and shrinking the size of a program (or the size of a ROM). In recent years, as the performance of a CPU has been improved, the number of functions implementable by a single CPU has increased and the size of an application program has further increased correspondingly. Under the circumstances such as these, the size of a ROM for storing such a large-sized program dominates over the area of a CPU core. Accordingly, the cost effectiveness of a CPU is greatly dependent on how small the size of a program, applicable to the CPU, can be.

The prior art, developed to solve this task, will be described. In accordance with this technique, the architecture of an instruction set for a general-purpose microprocessor is extended to reduce the size of a program.

FIG. 22 illustrates examples of MIPS architecture instruction format for a data processor in the pertinent prior art. Specifically, FIG. 22(a) illustrates a MIPS-II/III instruction format used for executing a register-to-register instruction where the length of a basic instruction word (hereinafter, simply referred to as a "basic instruction length") is fixed at 32 bits. In contrast, FIG. 22(b) illustrates MIPS16 instruction formats where the basic instruction length is fixed at 16 bits.

In accordance with the MIPS architecture, 32 registers are provided. Thus, an instruction set in the MIPS-II/III format includes a plurality of register-addressing fields each composed of 5 bits. Also, since three operands are specified according to the MIPS-II/III format, this instruction set includes three register-addressing fields rs, rt and rd. The operation and functions of the instruction are defined using a 6-bit OP field, a 5-bit shamt field and a 6-bit func field. Accordingly, this instruction set has a fixed length of 32 bits in total.

In contrast, two types of instruction formats are definable for a register-to-register instruction included in an instruction set according to the MIPS16 format. In one of the two types of instruction formats, two 3-bit register-addressing fields rx and ry are provided to specify two operands and the operation and function of the instruction are defined using a 5-bit OP field and a 5-bit func field. In the other instruction format, three 3-bit register-addressing fields rx, ry and rz are provided to specify three operands and the operation and function of the instruction are defined using a 5-bit OP field and a 2-bit F field.

In accordance with the MIPS16 format shown in FIG. 22(b), only 3 bits are available for each register-addressing field. Accordingly, not all the 32 registers included in the original MIPS-II/III format, but some of these registers can be accessed.

Any instruction in the MIPS16 instruction format can be replaced with an associated instruction in the MIPS-II/III instruction format. Such replacement of an instruction in the MIPS16 instruction format with a counterpart in the MIPS-II/III instruction format is called an "extension" of an instruction.

FIG. 23 is a block diagram illustrating a main part of a data processor for executing instructions in the MIPS16 and MIPS-II/III formats. Hereinafter, the operation of this data processor will be described.

An instruction fetch section 300 is a block for fetching an instruction. Specifically, the instruction fetch section 300 fetches an instruction set in the MIPS16 instruction format with a fixed length of 16 bits or in the MIPS-II/III instruction format with a fixed length of 32 bits, and then outputs the fetched instruction set to an instruction extender 310. The type of the instruction set, i.e., whether the instruction set is in the MIPS16 or MIPS-II/III instruction format, is always specified by a mode setting signal.

The instruction extender 310 is also controlled by the mode setting signal. If the input instruction set is in the MIPS16 instruction format, then the instruction extender 310 extends the instruction set in the MIPS16 instruction format into that in the MIPS-II/III instruction format. Alternatively, if the input instruction set is in the MIPS-II/III instruction format, then the instruction extender 310 outputs the instruction set as it is without performing the extension. It is controlled by the mode setting signal whether or not the extension should be performed. Accordingly, the instruction extender 310 cannot determine the necessity from the instructions themselves. Since the mode setting signal is a programmable signal, the mode of operations can be switched at a desired time.

An instruction decoder 320 is a block for decoding the instruction in the MIPS-II/III instruction format and thereby producing a control signal. The operation of the data processor is controlled by the control signal produced by the instruction decoder 320.

The data processor having such a configuration can execute both a program described in the MIPS16 instruction format with a basic instruction length of 16 bits and a program described in the MIPS-II/III instruction format with a basic instruction length of 32 bits. Accordingly, if the code size should be prioritized, then programming is preferably carried out using the MIPS16 instruction format with a fixed length of 16 bits. On the other hand, if the performance should be respected first to access as large a number of register files as possible, then programming may be conducted using the MIPS-II/III instruction format. Thus, a program can be developed flexibly with a good balance struck between performance and code size. Nevertheless, it depends sometimes on the specifications of a particular system and sometimes on the size of a program which type of instruction formats should be used. For example, a certain type of format is used only when the size of a program reaches that of a task.

In order for a microprocessor to perform such an application (like signal processing) as requiring a large number of registers, the number of available registers should preferably be increased by adding some registers to preexistent ones such that the application can be performed at an even higher speed. In such a case, an instruction format, allowing the user to specify a larger number of registers than a conventional instruction format, may be produced and used instead of the conventional instruction format. However, the size of a resultant program considerably increases by the use of such an alternate instruction format.

Thus, the prior art may be modified in the following manner. A new instruction format, allowing the user to specify a larger number of registers, may be provided in addition to the conventional instruction format. And the newly provided instruction format and the conventional instruction format may be selectively employed in response to the mode setting signal of the prior art.

Nevertheless, if the mode setting signal of the prior art is used, then the code size still increases disadvantageously. That is to say, a switching instruction should be given to generate the mode setting signal in switching the instruction formats. Accordingly, if a plurality of instructions, described in these formats, are included within a single instruction set, then the switching instructions should also be given numerous number of times, thus adversely increasing the code size.

SUMMARY OF THE INVENTION

An object of this invention is providing a data processor allowing for the use of additional registers to execute instructions in several types of instruction formats included within a single instruction set and to switch these formats without the mode setting signal while effectively reducing the code size.

To achieve this object, according to the present invention, a first instruction format, allowing the user to specify a number of registers, and a second instruction format, allowing the user to specify a larger number of registers than that of the registers specified in the first instruction format, are used. The types of instructions, described in these formats, are identifiable by the instructions themselves. Accordingly, an application requiring a large number of registers, like signal processing, can be performed at a higher speed without increasing the code size.

Specifically, a data processor according to the present invention executes an instruction described in a first instruction format and an instruction described in a second instruction format. The first instruction format defines a register-addressing field of a predetermined size, while the second instruction format defines a register-addressing field of a size larger than the size of the register-addressing field defined by the first instruction format. The data processor includes: means, responsive to an instruction, for identifying the received instruction as being described in the first or second instruction format by the instruction itself; a first register file including a plurality of registers; and a second register file also including a plurality of registers, the number of the registers included in the second register file being larger than the number of the registers included in the first register file. If the identifying means has identified the received instruction as being described in the first instruction format, the data processor executes the instruction using data held in the first register file. On the other hand, if the identifying means has identified the received instruction as being described in the second instruction format, the data processor executes the instruction using data held in the second register file.

In one embodiment of the present invention, the first instruction format defines a number of instruction fields and the second instruction format defines another number of instruction fields. And the identifying means identifies the received instruction as being described in the first or second instruction format by the contents of at least one of the instruction fields of the instruction that is defined by at least one predetermined ordinal number.

In another embodiment of the present invention, the number of the instruction fields defined by the second instruction format is larger than the number of the instruction fields defined by the first instruction format.

In still another embodiment, the predetermined ordinal number of the instruction field used by the identifying means for format identification is first.

In still another embodiment, the second register file includes all of the registers included in the first register file.

In still another embodiment, the data processor further executes an instruction described in a third instruction format. The third instruction format specifies a plurality of operations and defines a register-addressing field of a size larger than that of the register-addressing field defined by the first instruction format. The register-addressing field defined by the third instruction format is used to specify one of the registers included in the second register file. Responsive to an instruction, the identifying means identifies the received instruction as being described in the third instruction format by the instruction itself.

Another data processor according to the present invention also executes an instruction described in a first instruction format and an instruction described in a second instruction format. The data processor includes: a register file including a predetermined number of registers, an address described in the first instruction format for specifying one of the registers being different from an address described in the second instruction format for specifying the same register; an address converter for receiving the instruction described in the first instruction format and converting an address described in the first instruction format, specified by the instruction to access one of the registers, into an address described in the second instruction format; and means, responsive to an instruction, for identifying the received instruction as being described in the first or second instruction format by the instruction itself. The output of the address converter is controlled by the output of the identifying means.

According to the present invention, an instruction format is provided for use in defining an arrangement of an instruction to be executed by a data processor. The instruction format is implemented as first and second instruction formats. The first instruction format defines a number of instruction fields and the second instruction format defines another number of instruction fields, the number of the instruction fields defined by the second instruction format being larger than the number of the instruction fields defined by the first instruction format. At least one of the instruction fields that are defined by the first and second instruction formats is used to identify the type of the instruction to be executed as being described in the first or second instruction format. The first instruction format defines a register-addressing field of a predetermined size, while the second instruction format defines a register-addressing field of a size larger than the size of the register-addressing field defined by the first instruction format.

In one embodiment of the present invention, the instruction format is implemented as a third instruction format. The third instruction format defines still another number of instruction fields, the number of the instruction fields defined by the third instruction format being larger than the number of the instruction fields defined by the first instruction format. The third instruction format defines a register-addressing field of a size larger than the size of the register-addressing field defined by the first instruction format. At least one of the instruction fields that are defined by the third instruction format is used to identify the type of the instruction to be executed as being described in the third instruction format. And the third instruction format describes a plurality of operations to be executed.

According to the present invention, the instruction itself is input to the identifying means, which identifies the instruction format thereof. In this case, the identifying means identifies the instruction format of the received instruction by the instruction itself, e.g., the contents of the first instruction field of the instruction. Accordingly, unlike the prior art, there is no need to use any special instruction to generate a mode setting signal or the like and the code size does not increase in vain. Accordingly, it is possible to effectively reduce the size of a program while allowing the user to execute a plurality of instructions described in several types of instruction formats included within a single instruction set.

In addition, in executing an instruction described in the first instruction format, a register to be accessed is specified from only a smaller number of registers included in the first register file. On the other hand, in executing an instruction described in the second instruction format, a register to be accessed can be specified from a larger number of registers included in the second register file. In this manner, arithmetic operations using these many registers can be described within a single instruction. Accordingly, the memory does not have to be accessed so frequently and data can be processed faster.

As can be understood, the present invention makes it possible to increase the number of usable registers and the speed of data processing while effectively reducing the size of a program.

Moreover, in accordance with the present invention, a plurality of operations can be specified within a single instruction described in the third instruction format. Accordingly, these operations, defined within a single instruction, can be performed in parallel, thus increasing the speed of data processing even more.

Furthermore, even if a bit assignment on the instruction code used to specify a register in the first instruction format is different from that used to specify the same register in the second instruction format, these bit assignments can be equalized through the address conversion by the address converter. Accordingly, complete compatibility can be maintained between a plurality of instruction formats, i.e., an instruction set described in one of the instruction formats can be executed without rewriting the instruction set into another instruction format.

BRIEF DESCRIPTION OF THE DRAWINGS

FIG. 1 is a diagram illustrating a second instruction format for a data processor according to an exemplary embodiment of the present invention.

FIG. 2 illustrates part of a list of instructions in the second instruction format to be executed by the data processor.

FIG. 4 illustrates part of a list of instructions in the third instruction format to be executed by the data processor.

FIG. 8 is a table of correspondence illustrating respective relationships among names, numbers and types of registers in the register file and associated bit assignments where the data processor executes instructions in the second instruction format.

FIG. 9 illustrates an example of a program written in C.

FIG. 10 illustrates a first example where the program shown in FIG. 9 is compiled in accordance with the first instruction format.

FIG. 11 illustrates a second example where the program shown in FIG. 9 is compiled in accordance with the first instruction format.

FIG. 12 illustrates a third example where the program shown in FIG. 9 is compiled in accordance with the first instruction format.

FIG. 13 illustrates an example where the program shown in FIG. 9 is compiled in accordance with the second instruction format.

FIG. 14 illustrates an FIR filter processing program described without using instructions in the third instruction format according to the embodiment of the present invention.

FIG. 15 illustrates a program obtained by rewriting the FIR filter processing program shown in FIG. 14 in accordance with the third instruction format according to the embodiment of the present invention.

FIG. 16 is a diagram illustrating a first instruction format (1) for the data processor according to the embodiment of the present invention.

FIG. 17 illustrates part of a list of instructions in the first instruction format (1) to be executed by the data processor.

FIG. 19 illustrates part of a list of instructions in the first instruction format (2) to be executed by the data processor.

FIG. 24 is a diagram illustrating specific examples of first, second and third instruction formats used in the embodiment of the present invention.

DESCRIPTION OF THE PREFERRED EMBODIMENTS

Figure 3:
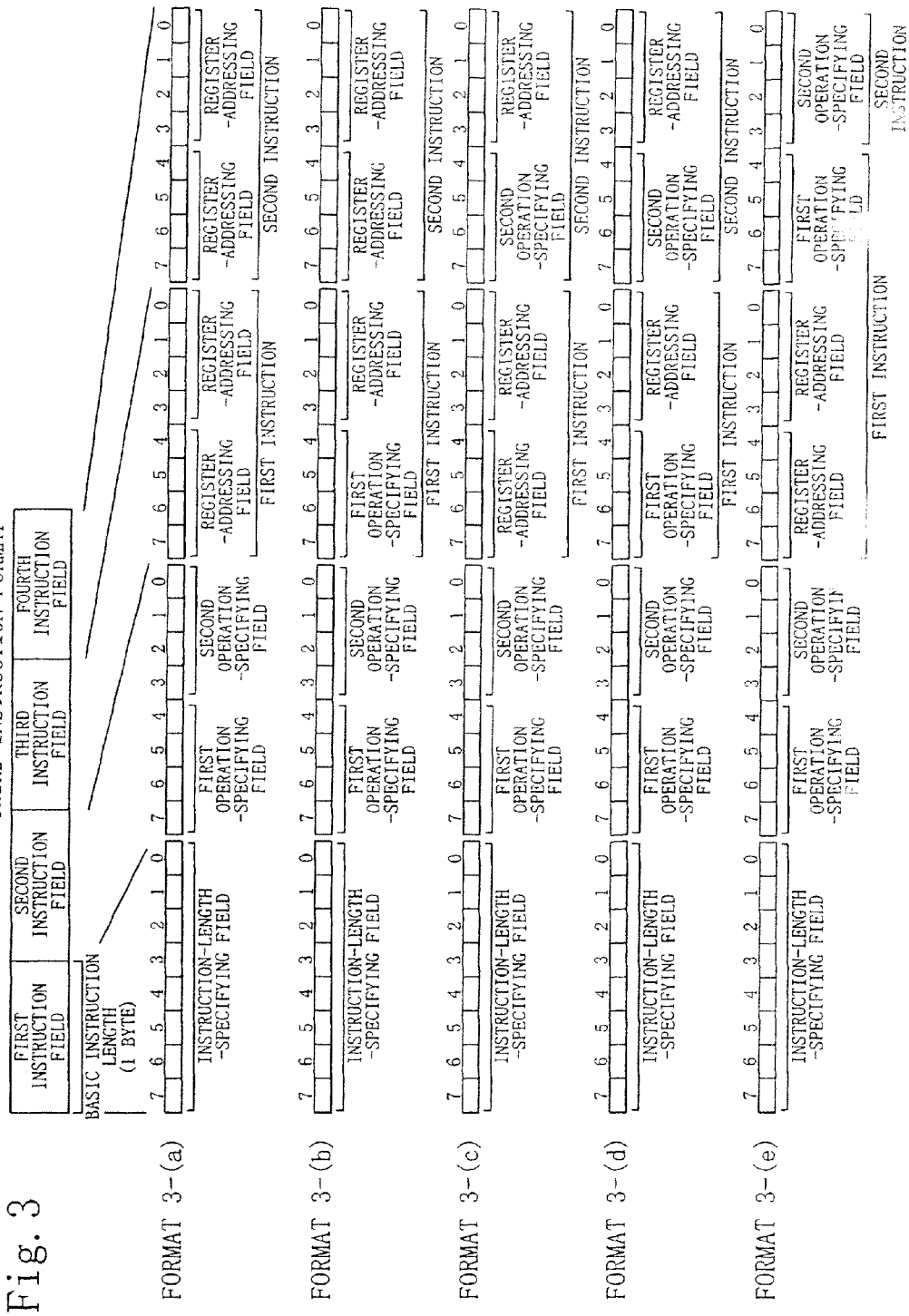
FIG. 3 is a diagram illustrating a third instruction format for the data processor according to the embodiment of the present invention.

Hereinafter, preferred embodiments of the present invention will be described with reference to the accompanying drawings. Before the arrangement of the data processor of the present invention is described, three types of instruction formats used in the following embodiments will be described.

FIGS. 16 through 19 illustrate an outline of a first instruction format in accordance with the architecture of this embodiment.

In the first instruction format, a variable-length instruction with a minimum instruction length of 1 byte is described. A 2-bit field is used as a register-addressing field. Accordingly, four registers can be specified with one register-addressing field. In this architecture, four address registers and four data registers are defined. By separately using the address registers or the data registers responsive to a specific instruction, eight registers can be used in total in executing an instruction.

FIG. 16 illustrates a bit assignment for the first instruction format (1) in which a first instruction field composed of 1 byte, equal to the minimum instruction length, consists of an operation-specifying field and an arbitrary number of register-addressing fields. Specific examples of this format will be described below.

In an exemplary first instruction format (1)-(a), the first instruction field includes two 2-bit register-addressing fields and is composed of 1 byte, which is the minimum instruction length. And two operands can be specified in accordance with this format.

In another exemplary first instruction format (1)-(b), the first instruction field includes two 2-bit register-addressing fields, and an additional information field is further provided. Thus, the instruction length in accordance with this format is 2 bytes or more in total.

In still another exemplary first instruction format (1)-(c), the first instruction field includes one 2-bit register-addressing field and is composed of 1 byte, which is the minimum instruction length. And one operand can be specified in accordance with this format.

In yet another exemplary first instruction format (1)-(d), the first instruction field includes one 2-bit register-addressing field, and an additional information field is further provided. Thus, the instruction length in accordance with this format is 2 bytes or more in total.

In yet another exemplary first instruction format (1)-(e), the first instruction field includes no register-addressing fields and is composed of 1 byte, which is the minimum instruction length. Accordingly, in accordance with this format, no operands can be specified using addresses.

In yet another exemplary first instruction format (1)-(f), the first instruction field includes no register-addressing fields but an additional information field is further provided. Thus, the instruction length in accordance with this format is 2 bytes or more in total.

FIG. 17 illustrates part of a list of specific instructions for respective types of bit assignment shown in FIG. 16. In FIG. 17, instruction mnemonics are shown on the left and the operations performed to execute these instructions are shown on the right.

Figure 18:
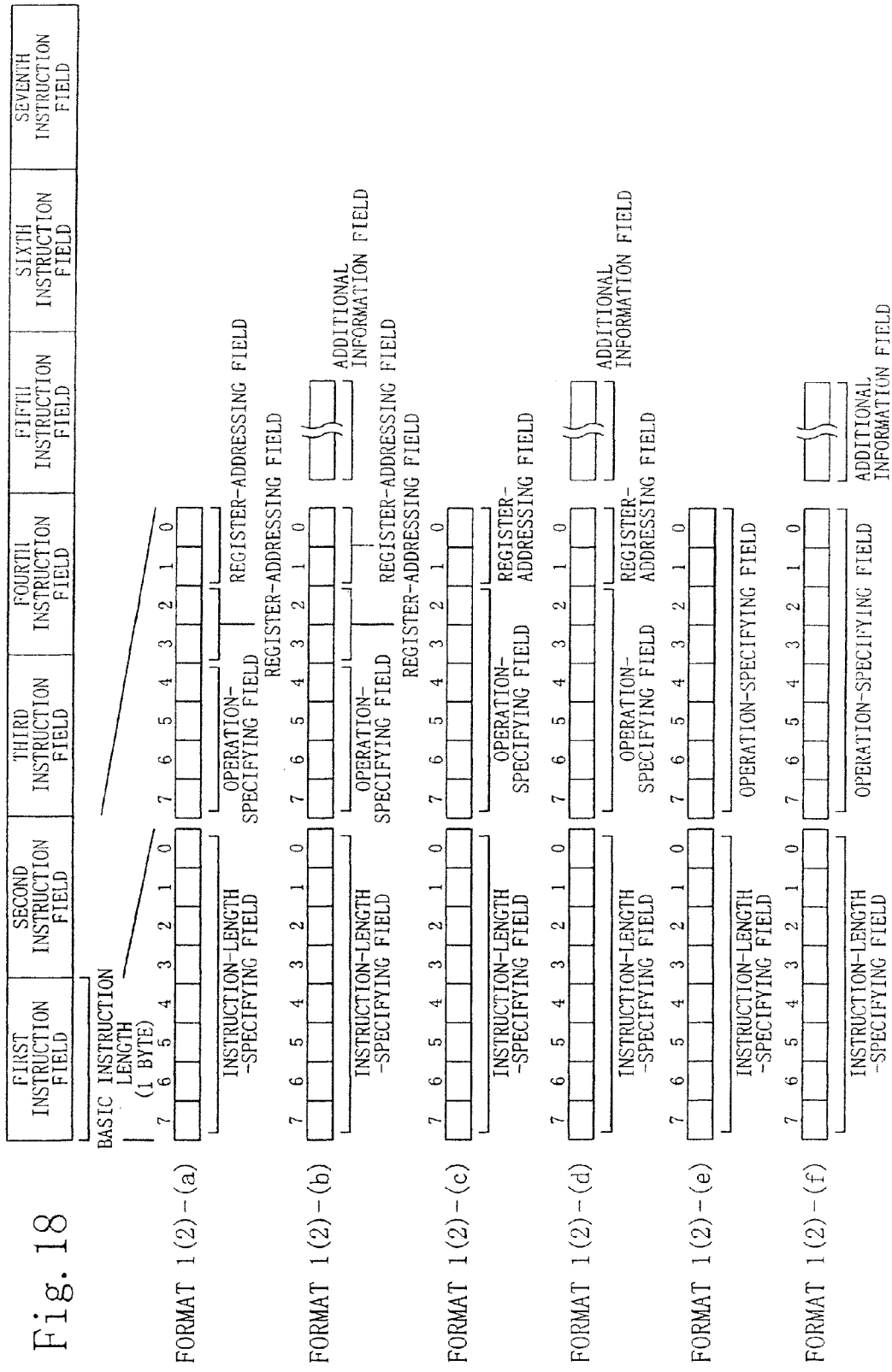
FIG. 18 is a diagram illustrating a first instruction format (2) for the data processor.

FIG. 18 illustrates a bit assignment for a first instruction format (2) in which a first instruction field composed of 1 byte, i.e., the minimum instruction length, consists of an instruction-length-specifying field and a second instruction field consists of an operation-specifying field and an arbitrary number of register-addressing fields. Specific examples of this format will be described in detail below.

In an exemplary first instruction format (2)-(a), the second instruction field includes two 2-bit register-addressing fields and the first and second instruction fields are composed of 2 bytes. And two operands can be specified in accordance with this format.

In another exemplary first instruction format (2)-(b), the second instruction field includes two 2-bit register-addressing fields, and an additional information field is further provided. Thus, the instruction length in accordance with this format is 3 bytes or more in total.

In still another exemplary first instruction format (2)-(c), the second instruction field includes one 2-bit register-addressing field and the first and second instruction fields are composed of 2 bytes. And one operand can be specified in accordance with this format.

In yet another exemplary first instruction format (2)-(d), the second instruction field includes one 2-bit register-addressing field, and an additional information field is further provided. Thus, the instruction length in accordance with this format is 3 bytes or more in total.

In yet another exemplary first instruction format (2)-(e), the second instruction field includes no register-addressing fields and the first and second instruction fields are composed of 2 bytes. Accordingly, in accordance with this format, no operands can be specified using addresses.

In yet another exemplary first instruction format (2)-(f), the second instruction field includes no register-addressing fields but an additional information field is further provided. Thus, the instruction length in accordance with this format is 3 bytes or more in total.

FIG. 19 illustrates part of a list of specific instructions for respective types of bit assignment shown in FIG. 18. In FIG. 19, instruction mnemonics are shown on the left and the operations performed to execute these instructions are shown on the right.

Accordingly, in accordance with the first instruction format shown in FIGS. 16 through 19, the instruction length of the first instruction field is used as a basic instruction length to specify a variable-length instruction. And an instruction can be described in this format to have a length N times as large as the basic instruction length and equal to or less than the maximum instruction length, which is M times as large as the basic instruction length (where N and M are both positive integers and $1 \leq N \leq M$). Since the minimum instruction length is 1 byte, this instruction format is suitable for downsizing a program.

Figures 20, 21:
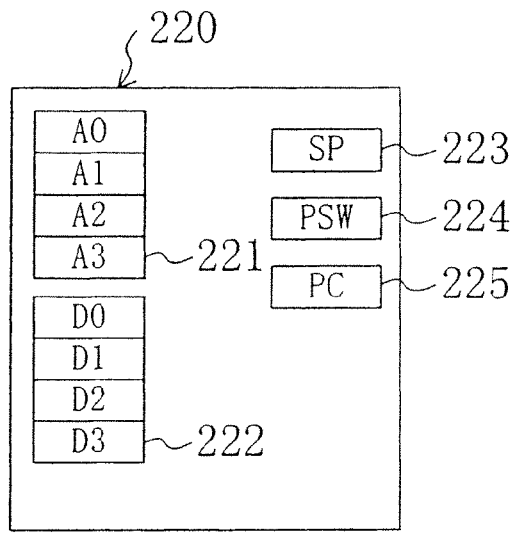
FIG. 20 is a block diagram illustrating an arrangement of register in a first register file of the data processor.
FIG. 21 is a table of correspondence illustrating respective relationships among names, numbers and types of registers in the register file and associated bit assignments where the data processor executes instructions in the first instruction format.
Figure 22A:
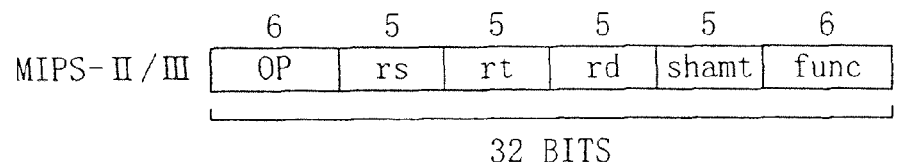
FIGS. 22(a) and 22(b) are diagrams illustrating exemplary instruction formats for a prior art data processor.
Figure 22B:
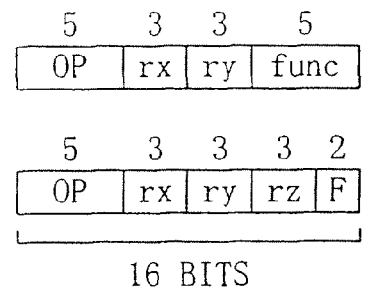
Figure 23:
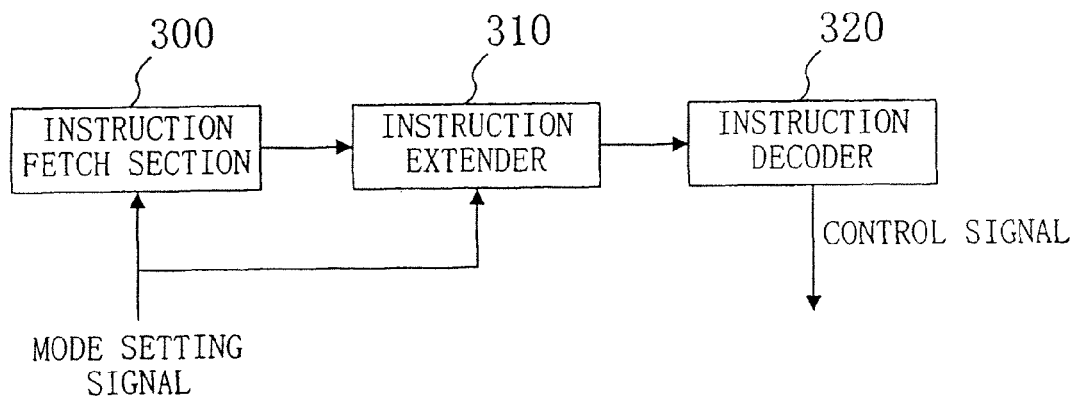
FIG. 23 is a block diagram illustrating an arrangement of a main part of the prior art data processor around an instruction decoder.

FIG. 20 illustrates a first register file 220 included in the data processor of the present invention. The first register file 220 includes: four address registers A0 through A3; four data registers D0 through D3; a stack pointer (SP) 223; a processor status word (PSW) 224 for holding internal status information and control information; and a program counter (PC) 225. The first register file 220 further includes two read ports and one write port, thereby enabling reading from two registers (or reading from one register twice) and writing into one register simultaneously.

FIG. 21 is a table illustrating accessing the address and data registers A0 through A3 and D0 through D3 included in the first register file 220 in greater detail. Specifically, this is a table of correspondence among name of a register specified by an instruction, bit assignment on an instruction code specified in a register-addressing field, and number and name of a physical register to be accessed.

In the first instruction format, the set of instruction addressing fields specified by respective instructions to access the four address registers A0 through A3 is the same as the set of instruction addressing fields specified by respective instructions to access the four data registers D0 through D3 as shown in FIG. 21. That is to say, the same 2-bit instruction addressing field is used to address a desired register, and it is determined by the operation of the instruction itself whether an address register or a data register should be accessed.

Next, respective bit assignments for second and third instruction formats, which are added as respective extensions to the first instruction format shown in FIGS. 16 and 18, i.e., the basic instruction format of this architecture, will be described with reference to FIGS. 1 and 3.

In each of the bit assignments shown in FIG. 1 for the second instruction format, a first instruction field, composed of 1 byte, which is the minimum instruction length, consists of an instruction-length-specifying field. And second and third instruction fields consist of an operation-specifying field and an arbitrary number of register-addressing fields. In accordance with the second instruction format, each register-addressing field is composed of 4 bits. Specific examples of this format will be described in detail below.

In an exemplary second instruction format (a), the third instruction field includes two 4-bit register-addressing fields and the first through third instruction fields are composed of 3 bytes in total. And two operands can be specified in accordance with this format.

In another exemplary second instruction format (b), the third instruction field includes two 4-bit register-addressing fields, and an additional information field is further provided. Thus, the instruction length in accordance with this format is 4 bytes or more in total.

In still another exemplary second instruction format (c), the third instruction field includes one 4-bit register-addressing field and the first through third instruction fields are composed of 3 bytes in total. And one operand can be specified in accordance with this format.

In yet another exemplary second instruction format (d), the third instruction field includes one 4-bit register-addressing field, and an additional information field is further provided. Thus, the instruction length in accordance with this format is 4 bytes or more in total.

Thus, in accordance with the second instruction format, the instruction length of first instruction field is also used as a basic instruction length. And an instruction can be described in this format to have a variable length N times as large as the basic instruction length and equal to or less than the maximum instruction length, which is M times as large as the basic instruction length (where N and M are both positive integers and $1 \leq N \leq M$).

FIG. 2 illustrates part of a list of specific instructions for respective types of bit assignment shown in FIG. 1. In FIG. 2, instruction mnemonics are shown on the left and the operations performed to execute these instructions are shown on the right. The mnemonic Rm, Rn or Ri indicates the address of a specified register. In this case, any of sixteen general-purpose registers, namely, four address registers A0 through A3, four data registers D0 through D3 and eight extended registers E0 through E7, may be specified. Addressing of registers, as well as the configuration thereof, will be described in greater detail later.

In each of the bit assignments shown in FIG. 3 for the third instruction format, a first instruction field, composed of 1 byte, which is the minimum instruction length, consists of an instruction-length-specifying field. A second instruction field consists of first and second operation-specifying fields, each composed of 4 bits. Each of third and fourth instruction fields consists of: a pair of 4-bit register-addressing fields: a pair of 4-bit operation-specifying fields; or a combination of one 4-bit register-addressing field and one 4-bit operation-specifying field. In accordance with the third instruction format, each register-addressing field is composed of four bits. In the following description, respective operations specified by the first and second operation-specifying fields, which are located in the second instruction field of the instruction described in this third instruction format, will be called "units".

Each unit is one of the instructions described in this third instruction format and corresponds to one of various instructions described in the second instruction format and used particularly frequently. In accordance with this third instruction format, the length of each operation-specifying field is shortened from eight bits in the second instruction format into four bits. Accordingly, two operations to be executed in parallel to each other can be described within a pair of operation-specifying fields. Thus, in accordance with this third instruction format, although the number of operations that can be described is limited, the code size thereof is smaller as compared with describing operations in the second instruction format.

In an exemplary third instruction format (a) shown in FIG. 3, the total instruction length is four bytes. The second instruction field consists of first and second operation-specifying fields, each composed of four bits. Each of the third and fourth instruction fields includes a pair of 4-bit register-addressing fields. Thus, four operands can be specified in accordance with this instruction format.

In another exemplary third instruction format (b) shown in FIG. 3, the total instruction length is also four bytes. The second instruction field also consists of first and second operation-specifying fields, each composed of four bits. The third instruction field consists of one 4-bit register-addressing field and a first operation-specifying field composed of four bits. And the fourth instruction field consists of a pair of 4-bit register-addressing fields. Thus, three operands can be specified in accordance with this instruction format.

In still another exemplary third instruction format (c) shown in FIG. 3, the total instruction length is also four bytes. The second instruction field also consists of first and second operation-specifying fields, each composed of four bits. The third instruction field consists of a pair of 4-bit register-addressing fields. And the fourth instruction field consists of one 4-bit register-addressing field and a second operation-specifying field composed of four bits. Thus, three operands can be specified in accordance with this instruction format.

In yet another exemplary third instruction format (d) shown in FIG. 3, the total instruction length is also four bytes. The second instruction field also consists of first and second operation-specifying fields, each composed of four bits. The third instruction field consists of one 4-bit register-addressing field and a first operation-specifying field composed of four bits. And the fourth instruction field consists of one 4-bit register-addressing field and a second operation-specifying field composed of four bits. Thus, two operands can be specified in accordance with this instruction format.

In yet another exemplary third instruction format (e) shown in FIG. 3, the total instruction length is also four bytes. The second instruction field also consists of first and second operation-specifying fields each composed of four bits. The third instruction field consists of a pair of 4-bit register-addressing fields. And the fourth instruction field consists of first and second operation-specifying fields each composed of four bits. Thus, two operands can be specified in accordance with this instruction format.

In this third instruction format, each of first and second units, specified by the first and second operation-specifying fields in the second instruction field, respectively, is an instruction described in the second instruction format (a) shown in FIG. 2 or an instruction described in the second instruction format (d). In the latter case, the bit width of an immediate value is reduced to four bits.

Accordingly, in accordance with the third instruction format, the first instruction field specifies a variable-length instruction of 4 bytes, consisting of first through fourth instruction fields.

FIG. 4 illustrates part of a list of specific instructions for respective types of bit assignment shown in FIG. 3. In FIG. 4, instruction mnemonics are shown on the left and the operations performed to execute these instructions are shown on the right. The mnemonic Rm1, Rn1, Rm2 or Rn2 indicates the address of a specified register. In this case, any of sixteen general-purpose registers, namely, four address registers A0 through A3, four data registers D0 through D3 and eight extended registers E0 through E7, may be specified. Also, imm4 indicates a 4-bit immediate value. Furthermore, Rm1 and Rn1 are used to execute the first unit specified by the first operation-specifying field in the second instruction field, while Rm2 and Rn2 are used to execute the second unit specified by the second operation-specifying field in the second instruction field. For details, see the following description of operation.

Figure 5:
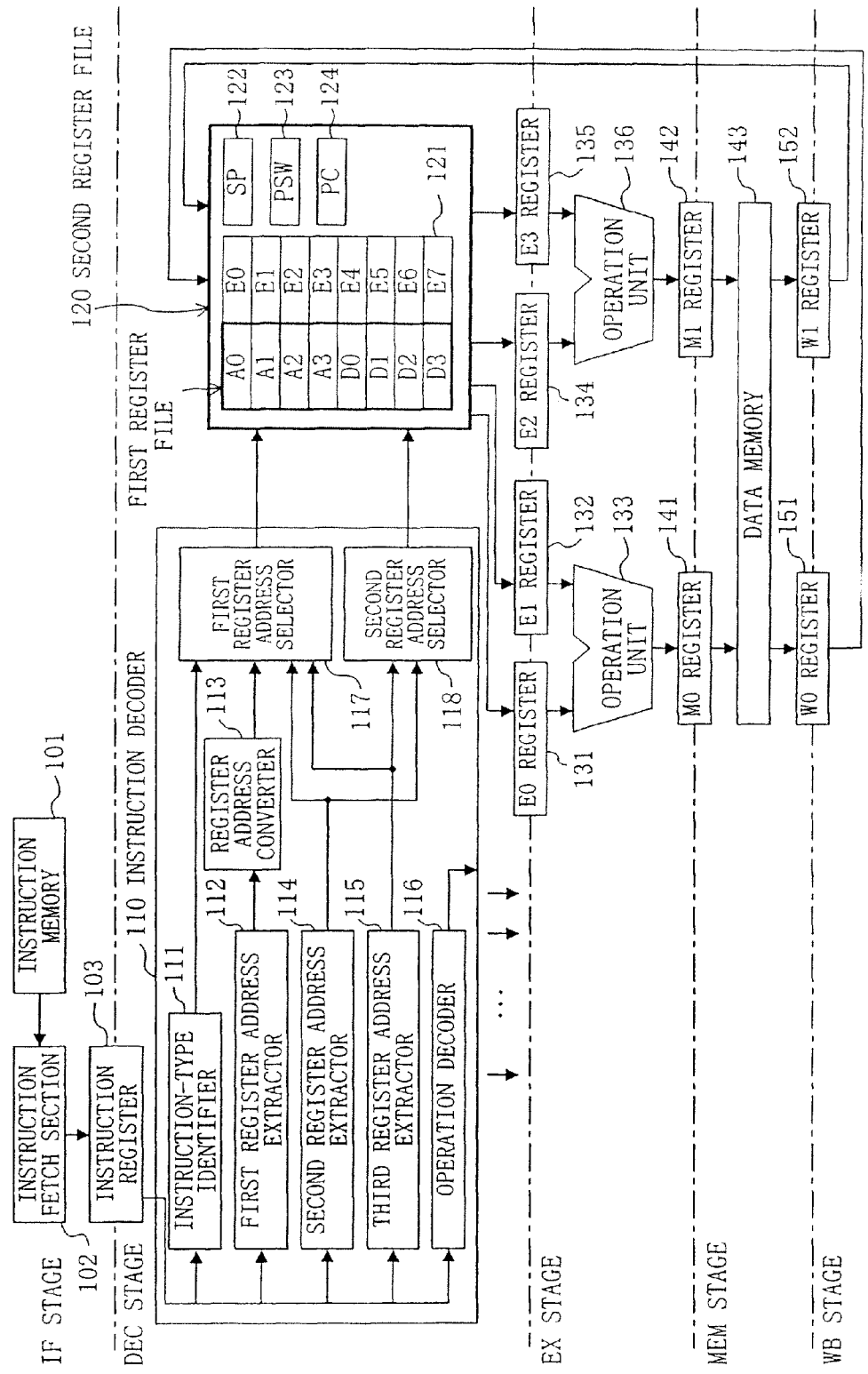
FIG. 5 is a block diagram illustrating an overall arrangement of the data processor.

FIG. 5 is a block diagram illustrating an overall arrangement of a data processor according to an exemplary embodiment of the present invention.

The data processor has a five-stage pipelining structure consisting of: an instruction fetch (IF) stage; a decode and register read (DEC) stage; an execution (EX) stage; a memory access (MEM) stage; and a register write back (WB) stage.

As shown in FIG. 5, the IF stage includes: an instruction memory 101; an instruction fetch section 102; and an instruction register 103. The instruction memory 101 stores a program. The instruction fetch section 102 reads out a variable-length instruction, described in the first, second or third format, from the instruction memory 101. And the instruction register 103 stores the variable-length instruction that has been read out via the instruction fetch section 102.

The DEC stage includes an instruction decoder 110 for receiving and decoding the variable-length instruction that has been stored in the instruction register 103.

Specifically, the instruction decoder 110 includes: an instruction-type identifier 111; first, second and third register address extractors 112, 114 and 115; a register address converter 113; an operation decoder 116; and first and second register address selectors 117 and 118.

The instruction-type identifier 111 decodes the variable-length instruction stored in the instruction register 103 to identify the type of the instruction format, i.e., which of the first, second and third instruction formats. If the type of the variable-length instruction stored in the instruction register 103 is identified as the first instruction format, then the first register address extractor 112 extracts a 2-bit register-addressing field. The register address converter 113 converts the value of the register address field, extracted by the first register address extractor 112, into a 4-bit register number in the register file. If the type of the variable-length instruction stored in the instruction register 103 is identified as the second instruction format, then the second register address extractor 114 extracts a 4-bit register-addressing field. And if the type of the variable-length instruction stored in the instruction register 103 is identified as the third instruction format, then the third register address extractor 115 extracts a 4-bit register-addressing field. Thereafter, the third register address extractor 115 supplies respective register addresses for the first and second units to the first and second register address selectors 117 and 118, respectively.

The operation decoder 116 receives and decodes the variable-length instruction stored in the instruction register 103 and produces a control signal to be supplied to the EX stage. Based on the results of identification performed by the instruction-type identifier 111, the first register address selector 117 selectively supplies the output of the register address converter 113, the second register address extractor 114 or the third register address extractor 115 to a second register file 120. The second register address selector 118 selectively supplies either the output of the second register address extractor 114 or the output of the third register address extractor 115 to the second register file 120. In this embodiment, the register address converter 113 always converts the extracted register address irrespective of the type of the instruction format. However, if the instruction-type identifier 111 can identify the type of instruction quickly, the address conversion may be naturally performed only on an instruction that has been identified as being described in the first instruction format.

The second register file 120 includes the first register file 220 shown in FIG. 20 and is additionally provided with eight extended registers E0 through E7. Accordingly, the second register file 120 includes sixteen general-purpose registers in total: A0 through A3; D0 through D3; and E0 through E7. If the instruction in question is in the first or second instruction format, the addresses of these registers are input from the first register address selector 117 of the instruction decoder 110. Alternatively, if the instruction in question is in the third instruction format, the addresses of these registers are input from the second register address selector 118. The second register file 120 is different from the first register file 220 shown in FIG. 20 in that the eight extended registers E0 through E7 are additionally provided for the second register file 120. The other general-purpose registers, i.e., the four address registers A0 through A3 and the four data registers D0 through D3, are used in common by these register files 120 and 220.

The EX stage includes: E0, E1, E2 and E3 registers 131, 132, 134 and 135 for storing the respective outputs from the register file 120; and operation units 133 and 136. The operation unit 133 performs an arithmetic or logical operation using the contents of the E0 and E1 registers 131 and 132, while the operation unit 136 performs an arithmetic or logical operation using the contents of the E2 and E3 registers 134 and 135.

The MEM stage includes: M0 and M1 registers 141 and 142; and a data memory 143. The M0 and M1 registers 141 and 142 are pipeline registers for storing the outputs of the operation units 133 and 136, respectively. The data memory 143 stores the data that has been stored in the M0 and M1 registers 141 and 142.

And the WB stage includes W0 and W1 registers 151 and 152, which are pipeline registers for storing the output of the data memory 143.

Figures 6, 7:
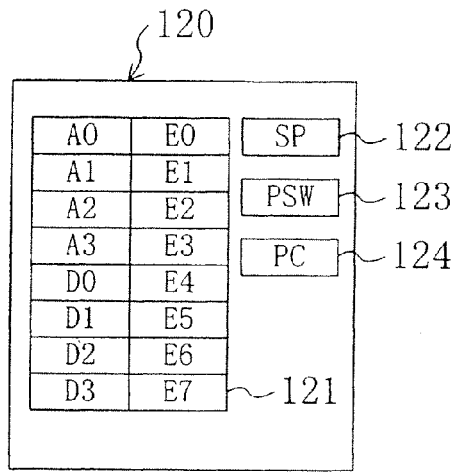
FIG. 6 is a block diagram illustrating an arrangement registers in a register file of the data processor.
FIG. 7 is a table of correspondence illustrating respective relationships among names, numbers and types of registers in the register file and associated bit assignments where the data processor executes instructions in the first instruction format.

FIG. 6 illustrates the second register file 120 extracted from FIG. 5. And FIGS. 7 and 8 illustrate in greater detail accessing general-purpose registers included in this register file 120.

FIG. 7 is a table of correspondence among name of a register specified during the execution of an instruction defined in the first instruction format, bit assignment on an instruction code specified in a register-addressing field, and number and name of a physical register to be accessed. In accordance with the first instruction format, each register-addressing field is composed of only 2 bits. However, in this case, there are sixteen general-purpose registers, each of which should be accessed using a 4-bit address. Accordingly, address conversion should be performed. For example, in accessing an address register A0 and a data register D1, "1000" and "1101" should be produced as respective physical register numbers and then output to a file 121 of general-purpose registers.

FIG. 8 is a table of correspondence among name of a register specified during the execution of an instruction defined in the second instruction format, bit assignment on an instruction code specified in a register-addressing field, and number and name of a physical register to be accessed. In accordance with the second instruction format, each register-addressing field is composed of 4 bits, which is used as a physical register number as it is.

The operation of the data processor of the present invention having such a configuration will be described with reference to FIGS. 5 through 8.

An instruction is given to the instruction-type identifier 111 shown in FIG. 5. In response thereto, the instruction-type identifier 111 identifies the type of the given instruction, i.e., which of the first, second and third instruction formats, by decoding a particular bit in the first instruction field. Then, the instruction-type identifier 111 produces a control signal associated with each of these formats. Hereinafter, it will be described in greater detail how the type of the instruction format is identified.

FIG. 24 illustrates specific examples of instruction formats. As shown in FIG. 24, the first instruction format (1) may be implemented as S0, S1, S2, S4 or S6. The instruction S0 includes only a 1-byte operation code OP and has a minimum length of one byte. In contrast, the other instructions S1, S2, S4 and S6 additionally includes 8-, 16-, 32- or 48-bit immediate value imm, displacement d or absolute value abs, and are composed of 2, 3, 5 and 7 bytes, respectively. The first instruction format (2) may be implemented as D0, D1, D2, D4 or D5. The instruction D0 includes only a 2-byte operation code OP and has a minimum length of two bytes. In contrast, the other instructions D1, D2, D4 and D5 additionally includes 8-, 16-, 32- or 40-bit immediate value imm, displacement d or absolute value abs, and are composed of 3, 4, 6 and 7 bytes, respectively. The second instruction format may be implemented as T0, T1, T3 or T4. The instruction T0 includes only a 3-byte operation code OP and has a minimum length of three bytes. In contrast, the other instructions T1, T3 and T4 additionally includes 8-, 24- or 32-bit immediate value imm, displacement d or absolute value abs, and are composed of 4, 6 and 7 bytes, respectively. The third instruction format is herein implemented as an instruction Q0 and is composed of only a 4-byte operation code OP. In the instruction formats shown in FIG. 24, judging only from the number of operation codes OP, the number of operation fields (i.e., three) of the instructions T0 through T4 in the second instruction format is larger than that of the instructions S0 through S6 in the first instruction format (1) (i.e., one) or that of the instructions D0 through D5 in the first instruction format (2) (i.e., two). Also, the number of instruction fields (i.e., four) of the instruction Q0 in the third instruction format is larger than that (i.e., three) of the instructions T0 through T4 in the second instruction format. The first instruction formats (1) and (2) are assigned to instructions that can be described in a relatively small number of fields and are specified frequently. On the other hand, the second instruction format is assigned to instructions that are described in a relatively large number of fields and are specified less frequently.

In the variable-length instructions shown in FIG. 24, the bit codes are assigned to respective first bytes as shown on the right column in FIG. 24 depending on the respective types S0 through S6, D0 through D5, T0 through T4 and Q0. Accordingly, by recognizing the bit codes in the first byte, the type of the received instruction can be uniquely identified as being first, second or third instruction format. In this embodiment, the type of the instruction format is identified only by the bit codes in the first byte. Alternatively, the type of the instruction format may be identified according to the present invention by: the fourth bit of the second byte (i.e., the most significant bit of the lower nibble) in addition to the first byte; part of the first byte, not all of it; or part or all of a byte that is defined by a predetermined ordinal number.

First, it will be exemplified how an instruction MOV A0, D0 in the first instruction format is executed as well as individual times of operations. This is a register-to-register transfer instruction that the contents of the address register A0 should be read out and then stored in the data register D0.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the first instruction format and output a control signal indicative of the type to the first register address selector 117. The first register address extractor 112 extracts a source register address "00", which is the address of the address register A0, and a destination register address "00", which is the address of the data register D0. The register address converter 113 converts the address "00" of the address register A0 and the address "00" of the data register D0 into 4-bit addresses "1000" and "1100", respectively. Responsive to the control signal supplied from the instruction-type identifier 111, the first register address selector 117 outputs the addresses, supplied from the register address converter 113, to the register file 120. The operation decoder 116 decodes the instruction as a register-to-register transfer instruction from the address register A0 to the data register D0, thereby producing an associated control signal.

The contents of the address register A0, associated with the physical address "1000", are read out as a source operand from the register file 120 and then stored in the E0 register 131.

(c) EX Stage

The data stored in the E0 register 131 is passed through the operation unit 133 and then stored in the M0 register 141.

(d) MEM Stage

The data stored in the M0 register 141 is passed through the data memory 143 and then stored in the W0 register 151.

(e) WB Stage

The data stored in the W0 register 151 is written into the data register D0 associated with the physical address "1100".

The above-described operations enable the execution of an instruction in the first instruction format.

Next, it will be exemplified how an instruction MOV A0, E7 in the second instruction format is executed as well as individual times of operations. This is a register-to-register transfer instruction that the contents of the address register A0 should be read out and then stored in the extended register E7.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "1000", which is the address of the address register A0, and a destination register address "0111", which is the address of the extended register E7. Responsive to the control signal supplied from the instruction-type identifier 111, the first register address selector 117 outputs the addresses, supplied from the second register address extractor 114, to the register file 120. The operation decoder 116 decodes the instruction as a register-to-register transfer instruction from the address register A0 to the extended register E7, thereby producing an associated control signal.

The contents of the address register A0, associated with the physical address "1000", are read out as a source operand from the register file 120 and then stored in the E0 register 131.

(c) EX Stage

The data stored in the E0 register 131 is passed through the operation unit 133 and then stored in the M0 register 141.

(d) MEM Stage

The data stored in the M0 register 141 is passed through the data memory 143 and then stored in the W0 register 151.

(e) WB Stage

The data stored in the W0 register 151 is written into the extended register E7 associated with the physical address "0111".

The above-described operations enable the execution of an instruction in the second instruction format.

Next, it will be exemplified how an instruction MOV_MOV E5, E6, E4, E7 in the third instruction format is executed as well as individual times of operations. This is a parallel register-to-register transfer instruction that the contents of the extended register E5 should be read out and stored in the extended register E6, and at the same time, the contents of the extended register E4 should be read out and stored in the extended register E7.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the third instruction format and output a control signal indicative of the type to the first register address selector 117.

Following the first transfer instruction, the third register address extractor 115 extracts a source register address "0101", which is the address of the extended register E5, and a destination register address "0110", which is the address of the extended register E6. In addition, following the second transfer instruction, the third register address extractor 115 also extracts a source register address "0100", which is the address of the extended register E4, and a destination register address "0111", which is the address of the extended register E7.

Responsive to the control signal supplied from the instruction-type identifier 111, the first register address selector 117 outputs the first and second sets of addresses, supplied from the third register address extractor 115, to the register file 120.

The operation decoder 116 decodes the instruction as a parallel register-to-register transfer instruction VLIW from the extended register E5 to the extended register E6 and from the extended register E4 to the extended register E7, thereby producing an associated control signal.

The contents of the extended register E5, associated with the physical address "0101", are read out as a first source operand from the register file 120 and then stored in the E0 register 131. At the same time, the contents of the extended register E4, associated with the physical address "0100", are read out as a second source operand from the register file 120 and then stored in the E2 register 134.

(c) EX Stage

The data stored in the E0 register 131 is passed through the operation unit 133 and then stored in the M0 register 141. Simultaneously, the data stored in the E2 register 134 is passed through the operation unit 136 and then stored in the M1 register 142.

(d) MEM Stage

The data stored in the M0 register 141 is passed through the data memory 143 and then stored in the W0 register 151. Concurrently, the data stored in the M1 register 142 is passed through the data memory 143 and then stored in the W1 register 152.

(e) WB Stage

The data stored in the W0 register 151 is written into the extended register E6 associated with the physical address "0110". At the same time, the data stored in the W1 register 152 is written into the extended register E7 associated with the physical address "0111".

The above-described operations enable the execution of an instruction in the third instruction format.

As can be understood from the foregoing description, the data processor of the present invention can execute any instruction without switching modes, no matter which of the first, second and third formats the instruction is described in. Also, the data processor of the present invention can execute an instruction set, which has been optimized for reducing the code size, with its upward compatibility completely maintained and with the number of available registers considerably increased.

Next, specific examples showing how instructions in the first instruction format are made compatible with counterparts in the second instruction format will be described.

FIG. 9 illustrates a brief example of a program written in C. This is a simple instruction that the contents of a variable a should be added to the contents of a variable b and the sum should be stored as a new variable a, and that the contents of a variable c should be added to the contents of a variable d and the sum should be stored as a new variable c.

The exemplary results obtained by compiling this program into instructions in the first instruction format are shown in FIGS. 10, 11 and 12.

FIG. 10 illustrates an instruction set where all the variables are assigned to the data registers. Specifically, the variables a, b, c and d are supposed to have been successfully assigned to the data registers D0, D1, D2 and D3, respectively. Such a state is feasible by executing only two addition instructions. However, since there are only four data registers, it is difficult to assign all of these variables to the same number of registers.

FIG. 11 illustrates an instruction set where the respective variables are assigned to stack regions on a data memory. Specifically, the variables a, b, c and d are supposed to have been successfully assigned to (SP+#4), (SP+#8), (SP+#12) and (SP+#16), respectively. In this case, not only the two addition instructions, but also eight data transfer instructions between memory and registers, i.e., Instructions 1 through 8, should be executed. As a result, the processing performance of the data processor considerably deteriorates.

FIG. 12 illustrates an instruction set further including data transfer instructions, i.e., Instructions 1, 2, 11 and 12, to save and restore the contents of the data registers D0 and D1 used for addition. In such a case, only non-destructive registers can be used.

In contrast, FIG. 13 illustrates an instruction set where all the variables are assigned to extended registers in accordance with the second instruction format. Specifically, the variables a, b, c and d are supposed to have been successfully assigned to the extended registers E0, E1, E2 and E3, respectively. Such a state is feasible by executing two addition instructions. Since the number of extended registers is also limited, a sufficiently large number of registers are not always available from the extended registers. However, in this case, the number of registers available is much larger than the case shown in FIG. 10, the performance of the data processor is less likely to deteriorate due to frequent access to the memory. Accordingly, in order to execute an application program, requiring a large number of registers as in signal processing, in as short a time as possible, the extended registers E0 through E7 should be added and the second instruction format should be used. In such a case, the number of times the memory is accessed can be reduced and the processing performance can be improved.

In addition, even if an address specified for a certain register in the first instruction format is different from an associated address specified for the same register in the second instruction format, the first and second instruction formats can be used interchangeably in this embodiment. This is because the address specified in the first instruction format can be converted into the address specified in the second instruction format. Accordingly, even if the number of registers is increased by the addition of extended registers, the first and second instruction formats can be used with upward compatibility completely maintained. Consequently, the present invention is particularly advantageous in that this data processor can cope with the addition of registers flexibly.

Next, specific examples of how to execute instructions in the third instruction format will be described.

FIG. 14 illustrates a main part of a program for an FIR filter that processes a medium such as a software-driven modem. In FIG. 14, the program is described without using instructions in the third instruction format, and the code sizes of respective instructions are shown on the right of associated operands.

Instruction 1 represents a half-word transfer instruction from a register to a memory (store) in the first instruction format. Instruction 2 represents a half-word swap instruction (swap) in the second instruction format. Instruction 3 represents a half-word transfer instruction from a register to a memory (store) in the second instruction format. Instruction 4 represents a dual half-word multiply-and-accumulate instruction in the second instruction format. Instruction 5 represents a subtraction instruction in the second instruction format. Instructions 6 and 7 each represent a transfer instruction from a memory to a register (load) in the second instruction format. And Instruction 8 represents a conditional branch instruction in the first instruction format.

Hereinafter, specific times of operations will be described.

Instruction 1 MOVH D0, (#−6, A3) is a register-to-memory transfer instruction (store) in the first instruction format that a value in the data register D0 should be stored at a memory address obtained by subtracting "6" from an address stored in the address register A3.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the first instruction format and output a control signal indicative of the type to the first register address selector 117. The first register address extractor 112 extracts source register addresses "00" and "11", which are the respective addresses of the data register D0 and the address register A3. The register address converter 113 converts the address "00" of the data register D0 and the address "11" of the address register A3 into 4-bit addresses "1100" and "1011", respectively.

Responsive to the control signal supplied from the instruction-type identifier 111, the first register address selector 117 outputs the respective 4-bit addresses "1100" and "1011" of the data and address registers D0 and A3, supplied from the register address converter 113, to the register file 120.

The operation decoder 116 decodes the instruction as a register-to-memory transfer instruction (store) that a value in the data register D0 should be stored at a memory address obtained by subtracting "6" from an address stored in the address register A3, thereby producing an associated control signal.

The contents of the data register D0, associated with the physical address "1100", are read out as a source operand from the register file 120 and then stored in the E0 register 131. And the contents of the address register A3, associated with the physical address "1011", are read out as another source operand from the register file 120 and then stored in the E1 register 132.

(c) EX Stage

The data stored in the E0 register 131 is passed through the operation unit 133 and then stored in the M0 register 141. In response to the control signal supplied from the operation decoder 116, the operation unit 133 subtracts "6" from the address stored in the E1 register 132 and outputs the result of subtraction to an address input section of the data memory 143.

(d) MEM Stage

The data stored in the M0 register 141 is stored in the data memory 143 at an address specified by the result of subtraction performed by the operation unit 133.

(e) WB Stage

No operations are performed.

Instruction 2 SWHW E0, E2 is an instruction in the second instruction format that data, obtained by swapping the upper and lower half words of the data stored in the extended register E0, should be stored in the extended register E2.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0000", which is the address of the extended register E0, and a destination register address "0010", which is the address of the extended register E2.

Responsive to the control signal supplied from the instruction-type identifier 111, the first register address selector 117 outputs the addresses, supplied from the second register address extractor 114, to the register file 120. The operation decoder 116 decodes the instruction to find that data, obtained by swapping the upper and lower half words of the data stored in the extended register E0, should be stored in the extended register E2, thereby producing an associated control signal.

The contents of the extended register E0, associated with the physical address "0000", are read out as a source operand from the register file 120 and then stored in the E0 register 131.

(c) EX Stage

Responsive to the control signal supplied from the operation decoder 116, the operation unit 133 performs a swapping operation on the data stored in the E0 register 131 by swapping the upper and lower half words thereof. Then, the result of this operation is stored in the M0 register 141.

(d) MEM Stage

The data stored in the M0 register 141 is passed through the data memory 143 and then stored in the W0 register 151.

(e) WB Stage

The data stored in the W0 register 151 is read out and then stored in the register file 120 at the destination address "0010" specified by the second register address extractor 114.

Instruction 3 MOVH E2, (#−4, A3) is a register-to-memory transfer instruction (store) in the second instruction format that a value in the extended register E2 should be stored at a memory address obtained by subtracting "4" from an address stored in the address register A3.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The first register address extractor 112 extracts a source register address "11", which is the address of the address register A3. The second register address extractor 114 extracts another source register address "0010", which is the address of the extended register E2. The register address converter 113 converts the address "11" of the address register A3 into a 4-bit address "1011".

Responsive to the control signal supplied from the instruction-type identifier 111, the first register address selector 117 outputs the 4-bit address "1011" of the address register A3, supplied from the register address converter 113, and the 4-bit address "0010" of the extended register E2 to the register file 120.

The operation decoder 116 decodes the instruction as a register-to-memory transfer instruction (store) that a value in the extended register E2 should be stored at a memory address obtained by subtracting "4" from an address stored in the address register A3, thereby producing an associated control signal.

The contents of the extended register E2, associated with the physical address "0010", are read out as a source operand from the register file 120 and then stored in the E0 register 131. And the contents of the address register A3, associated with the physical address "1011", are read out as another source operand from the register file 120 and then stored in the E1 register 132.

(c) EX Stage

The data stored in the E0 register 131 is passed through the operation unit 133 and then stored in the M0 register 141. In response to the control signal supplied from the operation decoder 116, the operation unit 133 subtracts "4" from the address stored in the E1 register 132 and outputs the result of subtraction to an address input section of the data memory 143.

(d) MEM Stage

The data stored in the M0 register 141 is stored in the data memory 143 at the address specified by the result of subtraction performed by the operation unit 133.

(e) WB Stage

No operations are performed.

Instruction 4 DMACH E6, E1 is an instruction in the second instruction format that a product obtained by multiplying together the respective upper half words of the data stored in the extended registers E6 and E1 should be added to a product obtained by multiplying together the respective lower half words thereof and the sum should be accumulated in the extended register E1.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0110", which is the address of the extended register E6, and a destination register address "0001", which is the address of the extended register E1.

Responsive to the control signal supplied from the instruction-type identifier 111, the first register address selector 117 outputs the addresses, supplied from the second register address extractor 114, to the register file 120. The operation decoder 116 decodes the instruction to find that a product obtained by multiplying together the respective upper half words of the data stored in the extended registers E6 and E1 should be added to a product obtained by multiplying together the respective lower half words thereof and the sum should be accumulated in the extended register E1, thereby producing an associated control signal.

The contents of the extended register E6, associated with the physical address "0110", are read out as a source operand from the register file 120 and then stored in the E0 register 131. And the contents of the extended register E1, associated with the physical address "0001", are read out as another source operand from the register file 120.

(c) EX Stage

The operation unit 133 extracts and multiplies together the respective upper half words of the data stored in the E0 and E1 registers 131 and 132. At the same time, the operation unit 133 extracts and multiplies together the respective lower half words of the data stored in the E0 and E1 registers 131 and 132. These two products are added to the data stored in the E1 register 132. And the result of addition is stored in the M0 register 141.

(d) MEM Stage

The data stored in the M0 register 141 is passed through the data memory 143 and then stored in the W0 register 151.

(e) WB Stage

The data stored in the W0 register 151 is read out and then stored in the register file 120 at the destination address "0001" specified by the second register address extractor 114.

Instruction 5 SUB 1, E3 is a subtraction instruction in the second instruction format that "1" should be subtracted from the value stored in the extended register E3 and then the result of subtraction should be stored in the extended register E3.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0011", which is the address of the extended register E3, and a destination register address "0011", which is also the address of the extended register E3.

Responsive to the control signal supplied from the instruction-type identifier 111, the first register address selector 117 outputs the addresses, supplied from the second register address extractor 114, to the register file 120. The operation decoder 116 decodes the instruction to find that "1" should be subtracted from the value stored in the extended register E3, thereby producing an associated control signal.

The contents of the extended register E3, associated with the physical address "0011", are read out as a source operand from the register file 120 and then stored in the E0 register 131.

(c) EX Stage

The operation unit 133 reads out the data stored in the E0 register 131 and subtracts "1" therefrom. And the result of subtraction is stored in the M0 register 141.

(d) MEM Stage

The data stored in the M0 register 141 is passed through the data memory 143 and then stored in the W0 register 151.

(e) WB Stage

The data stored in the W0 register 151 is read out and then stored in the register file 120 at the destination address "0011" specified by the second register address extractor 114.

Instruction 6 MOV (#4, E4+), E6 is a post-increment memory-to-register transfer instruction in the second instruction format that data should be read out from the memory address of the extended register E4 and then stored in the extended register E6 and the value of the extended register E4 should be increased by "4" after the storage.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0100", which is the address of the extended register E4, and a destination register address "0110", which is the address of the extended register E6.

Responsive to the control signal supplied from the instruction-type identifier 111, the first register address selector 117 outputs the addresses, supplied from the second register address extractor 114, to the register file 120. The operation decoder 116 decodes the instruction as a post-increment memory-to-register transfer instruction that data should be read out from a memory address of the extended register E4 and then stored in the extended register E6 and the value of the extended register E4 should be increased by "4" after the storage, thereby producing an associated control signal.

The contents of the extended register E4, associated with the physical address "0100", are read out as a source operand from the register file 120 and then stored in the E0 register 131.

(c) EX Stage

The operation unit 133 reads out the data stored in the E0 register 131 and outputs the data to an address input section of the data memory 143 in response to the control signal supplied from the operation decoder 116. Also, the operation unit 133 adds "4" to the data read out, and stores the sum in the M0 register 141.

(d) MEM Stage

The data stored in the M0 register 141 is passed through the data memory 143 and then stored in the W0 register 151. Also, responsive to the control signal supplied from the operation decoder 116, data is read out from the data memory 143 at the specified memory address and then stored in the W0 register 151.

(e) WB Stage

The data stored in the W0 register 151 is read out and then stored in the register file 120 at the destination address "0110" specified by the second register address extractor 114.

Instruction 7 MOV (#4, E5+), E1 is a post-increment memory-to-register transfer instruction in the second instruction format that data should be read out from the memory address of the extended register E5 and then stored in the extended register E1 and the value of the extended register E5 should be increased by "4" after the storage.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0101", which is the address of the extended register E5, and a destination register address "0001", which is the address of the extended register E1.

Responsive to the control signal supplied from the instruction-type identifier 111, the first register address selector 117 outputs the addresses, supplied from the second register address extractor 114, to the register file 120. The operation decoder 116 decodes the instruction as a post-increment memory-to-register transfer instruction that data should be read out from the memory address of the extended register E5 and then stored in the extended register E1 and the value of the extended register E5 should be increased by "4" after the storage, thereby producing an associated control signal.

The contents of the extended register E5, associated with the physical address "0101", are read out as a source operand from the register file 120 and then stored in the E0 register 131.

(c) EX Stage

The operation unit 133 reads out the data stored in the E0 register 131 and outputs the data to an address input section of the data memory 143 in response to the control signal supplied from the operation decoder 116. Also, the operation unit 133 adds "4" to the data read out, and stores the sum in the M0 register 141.

(d) MEM Stage

The data stored in the M0 register 141 is passed through the data memory 143 and then stored in the W0 register 151. Also, responsive to the control signal supplied from the operation decoder 116, data is read out from the data memory 143 at the specified memory address and then stored in the W0 register 151.

(e) WB Stage

The data stored in the W0 register 151 is read out and then stored in the register file 120 at the destination address "0001" specified by the second register address extractor 114.

Instruction 8 LGE is an instruction in the first instruction format that if the result of subtraction performed to execute Instruction 4 is equal to or larger than "0", then a loop instruction should be executed by changing the value of the program counter 124 into an address LOOP shown in FIG. 14 above Instruction 1.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the first instruction format and output a control signal indicative of the type to the first register address selector 117. The operation decoder 116 decodes the instruction as a loop instruction, thereby producing an associated control signal.

Responsive to the control signal supplied from the operation decoder 116, the value of the program counter 124 in the register file 120 is stored in the E0 register 131.

(c) EX Stage

The operation unit 133 reads out the data stored in the E0 register 131 and stores the destination address of the loop in the M0 register 141 responsive to the control signal supplied from the operation decoder 116.

(d) MEM Stage

The data stored in the M0 register 141 is passed through the data memory 143 and then stored in the W0 register 151.

(e) WB Stage

The data stored in the W0 register 151 is stored at the program counter 124 in the register file 120.

Among the instructions shown in FIG. 14, Instructions 3 and 5 are composed of four bytes, Instructions 1, 2, 4, 6 and 7 are composed of three bytes and Instruction 8 is composed of one byte. That is to say, the total code size of the instructions shown in FIG. 14 is 24 bytes.

FIG. 15 illustrates respective instructions obtained by rewriting some of the instructions shown in FIG. 14 into associated instructions in the third instruction format. Specifically, Instructions 4 and 5 shown in FIG. 14 are merged into rewritten Instruction 4 DMACH_SUB and Instructions 7 and 8 shown in FIG. 14 are merged into rewritten Instruction 6 MOV_LGE.

In FIG. 15, Instruction 1 represents a half-word transfer instruction from a register to a memory in the first instruction format. Instruction 2 represents a half-word swap instruction (swap) in the second instruction format. Instruction 3 represents a half-word transfer instruction from a register to a memory in the second instruction format. Instruction 4 represents an instruction that a dual half-word multiply-and-accumulate operation and subtraction of an immediate value should be executed in parallel to each other. Instruction 5 represents a memory-to-register transfer instruction in the second instruction format. And Instruction represents an instruction that memory-to-register data transfer and conditional branch should be executed in parallel to each other.

Hereinafter, specific times of operations will be described.

Instruction 1 MOVH D0, (#−6, A3) is a register-to-memory transfer instruction (store) in the first instruction format that a value in the data register D0 should be stored at a memory address obtained by subtracting "6" from an address stored in the address register A3.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the first instruction format and output a control signal indicative of the type to the first register address selector 117. The first register address extractor 112 extracts source register addresses "00" and "11", which are the respective addresses of the data register D0 and the address register A3. The register address converter 113 converts the address "00" of the data register D0 and the address "11" of the address register A3 into 4-bit addresses "1100" and "1011", respectively.

Responsive to the control signal supplied from the instruction-type identifier 111, the first register address selector 117 outputs the respective 4-bit addresses "1100" and "1011" of the data and address registers D0 and A3, supplied from the register address converter 113, to the register file 120.

The operation decoder 116 decodes the instruction as a register-to-memory transfer instruction (store) that a value in the data register D0 should be stored at a memory address obtained by subtracting "6" from an address stored in the address register A3, thereby producing an associated control signal.

The contents of the data register D0, associated with the physical address "1100", are read out as a source operand from the register file 120 and then stored in the E0 register 131. And the contents of the address register A3, associated with the physical address "1011", are read out as another source operand from the register file 120 and then stored in the E1 register 132.

(c) EX Stage

The data stored in the E0 register 131 is passed through the operation unit 133 and then stored in the M0 register 141. In response to the control signal supplied from the operation decoder 116, the operation unit 133 subtracts "6" from the address stored in the E1 register 132 and outputs the result of subtraction to an address input section of the data memory 143.

(d) MEM Stage

The data stored in the M0 register 141 is stored in the data memory 143 at an address specified by the result of subtraction performed by the operation unit 133.

(e) WB Stage

No operations are performed.

Instruction 2 SWHW E0, E2 is an instruction in the second instruction format that data, obtained by swapping the upper and lower half words of the data stored in the extended register E0, should be stored in the extended register E2.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0000", which is the address of the extended register E0, and a destination register address "0010", which is the address of the extended register E2.

Responsive to the control signal supplied from the instruction-type identifier 111, the first register address selector 117 outputs the addresses, supplied from the second register address extractor 114, to the register file 120. The operation decoder 116 decodes the instruction to find that data, obtained by swapping the upper and lower half words of the data stored in the extended register E0, should be stored in the extended register E2, thereby producing an associated control signal.

The contents of the extended register E0, associated with the physical address "0000", are read out as a source operand from the register file 120 and then stored in the E0 register 131.

(c) EX Stage

Responsive to the control signal supplied from the operation decoder 116, the operation unit 133 performs a swapping operation on the data stored in the E0 register 131 by swapping the upper and lower half words thereof. Then, the result of this operation is stored in the M0 register 141.

(d) MEM Stage

The data stored in the M0 register 141 is passed through the data memory 143 and then stored in the W0 register 151.

(e) WB Stage

The data stored in the W0 register 151 is read out and then stored in the register file 120 at the destination address "0010" specified by the second register address extractor 114.

Instruction 3 MOVH E2, (#−4, A3) is a register-to-memory transfer instruction (store) in the second instruction format that a value in the extended register E2 should be stored at a memory address obtained by subtracting "4" from an address stored in the address register A3.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The first register address extractor 112 extracts a source register address "11", which is the address of the address register A3. The second register address extractor 114 extracts another source register address "0010", which is the address of the extended register E2. The register address converter 113 converts the address "11" of the address register A3 into a 4-bit address "1011".

Responsive to the control signal supplied from the instruction-type identifier 111, the first register address selector 117 outputs the 4-bit address "1011" of the address register A3, supplied from the register address converter 113, and the 4-bit address "0010" of the extended register E2 to the register file 120.

The operation decoder 116 decodes the instruction as a register-to-memory transfer instruction (store) that a value in the extended register E2 should be stored at a memory address obtained by subtracting "4" from an address stored in the address register A3, thereby producing an associated control signal.

The contents of the extended register E2, associated with the physical address "0010", are read out as a source operand from the register file 120 and then stored in the E0 register 131. And the contents of the address register A3, associated with the physical address "1011", are read out as another source operand from the register file 120 and then stored in the E1 register 132.

(c) EX Stage

The data stored in the E0 register 131 is passed through the operation unit 133 and then stored in the M0 register 141. In response to the control signal supplied from the operation decoder 116, the operation unit 133 subtracts "4" from the address stored in the E1 register 132 and outputs the result of subtraction to an address input section of the data memory 143.

(d) MEM Stage

The data stored in the M0 register 141 is stored in the data memory 143 at an address specified by the result of subtraction performed by the operation unit 133.

(e) WB Stage

No operations are performed.

Instruction 4 DMACH_SUB E6, E1, 1, E3 is an instruction in the third instruction format, and is composed of two units to be executed in parallel to each other. One of these units is an instruction that a product obtained by multiplying together respective upper half words of the data stored in the extended registers E6 and E1 should be added to a product obtained by multiplying together respective lower half words thereof, and the sum should be accumulated in the extended register E1. The other unit is an instruction that "1" should be subtracted from the data stored in the extended register E3.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the third instruction format and output a control signal indicative of the type to the first register address selector 117. The second register address extractor 114 extracts a source register address "0110", which is the address of the extended register E6, and a destination register address "0001", which is the address of the extended register E1. In addition, the third register address extractor 115 extracts "0011" as a source/destination register address, i.e., the address of the extended register E3.

Responsive to the control signal supplied from the instruction-type identifier 111, the first register address selector 117 outputs the addresses, supplied from the second register address extractor 114, to the register file 120. The operation decoder 116 decodes the instruction to find that a product obtained by multiplying together respective upper half words of the data stored in the extended registers E6 and E1 should be added to a product obtained by multiplying together respective lower half words thereof, and the sum should be accumulated in the extended register E1, thereby producing an associated control signal.

The contents of the extended register E6, associated with the physical address "0110", are read out as a source operand from the register file 120 and then stored in the E0 register 131. And the contents of the extended register E1, associated with the physical address "0001", are read out as another source operand from the register file 120 and then stored in the E1 register 132. In parallel to these operations, the contents of the extended register E3, associated with the physical address "0011", are read out as still another source operand from the register file 120 and then stored in the E2 register 134.

(c) EX Stage

The operation unit 133 extracts and multiplies together the respective upper half words of the data stored in the E0 and E1 registers 131 and 132. At the same time, the operation unit 133 extracts and multiplies together the respective lower half words of the data stored in the E0 and E1 registers 131 and 132. These two products are added to the data stored in the E1 register 132. And the sum is stored in the M0 register 141. In parallel thereto, the operation unit 133 also reads out the data stored in the E2 register 134 and subtracts "1" therefrom. And the result of subtraction is stored in the M1 register 142.

(d) MEM Stage

The data stored in the M0 register 141 is passed through the data memory 143 and then stored in the W0 register 151. Also, the data stored in the M1 register 142 is passed through the data memory 143 and then stored in the W1 register 152.

(e) WB Stage

The data stored in the W0 register 151 is read out and then stored in the register file 120 at the destination address "0001" specified by the second register address extractor 114. In parallel thereto, the data stored in the W1 register 152 is read out and then stored in the register file 120 at the destination address "0011" specified by the third register address extractor 115.

Instruction 5 MOV (#4, E4+), E6 is a post-increment memory-to-register transfer instruction in the second instruction format that data should be read out from a memory address of the extended register E4 and then stored in the extended register E6 and the value of the extended register E4 should be increased by "4" after the storage.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the second instruction format and output a control signal indicative of the type to the first register address selector 117. The second register address extractor 114 extracts a source register address "0100", which is the address of the extended register E4, and a destination register address "0110", which is the address of the extended register E6.

Responsive to the control signal supplied from the instruction-type identifier 111, the first register address selector 117 outputs the addresses, supplied from the second register address extractor 114, to the register file 120. The operation decoder 116 decodes the instruction as a post-increment memory-to-register transfer instruction that data should be read out from a memory address of the extended register E4 and then stored in the extended register E6 and the value of the extended register E4 should be increased by "4" after the storage, thereby producing an associated control signal.

The contents of the extended register E4, associated with the physical address "0100", are read out as a source operand from the register file 120 and then stored in the E0 register 131.

(c) EX Stage

The operation unit 133 reads out the data stored in the E0 register 131 and outputs the data to an address input section of the data memory 143 in response to the control signal supplied from the operation decoder 116. Also, the operation unit 133 adds "4" to the data read out, and stores the sum in the M0 register 141.

(d) MEM Stage

The data stored in the M0 register 141 is passed through the data memory 143 and then stored in the W0 register 151. Also, responsive to the control signal supplied from the operation decoder 116, data is read out from the data memory 143 at the specified memory address and then stored in the W0 register 151.

(e) WB Stage

The data stored in the W0 register 151 is read out and then stored in the register file 120 at the destination address "0110" specified by the second register address extractor 114.

Instruction 6 MOV_LGE (#4, E5+), E1 is an instruction in the third instruction format and is composed of two units to be executed in parallel to each other. One of these two units is a post-increment memory-to-register transfer instruction that data should be read out from a memory address of the extended register E5 and then stored in the extended register E1 and the value of the extended register E5 should be increased by "4" after the storage. The other unit is an instruction that if the result of subtraction performed to execute Instruction 4 is equal to or larger than "0", then a loop instruction should be executed by changing the value of the program counter 124 into an address LOOP shown in FIG. 15 above Instruction 1.

(a) IF Stage

The instruction fetch section 102 reads out the instruction from the instruction memory 101 and then stores the instruction in the instruction register 103.

(b) DEC Stage

The instruction-type identifier 111 decodes the instruction stored in the instruction register 103 to identify the type of this instruction as the third instruction format and output a control signal indicative of the type to the first register address selector 117. The second register address extractor 114 extracts a source register address "0101", which is the address of the extended register E5, and a destination register address "0001", which is the address of the extended register E1.

Responsive to the control signal supplied from the instruction-type identifier 111, the first register address selector 117 outputs the addresses, supplied from the second register address extractor 114, to the register file 120. The operation decoder 116 decodes the instruction as a post-increment memory-to-register transfer instruction that data should be read out from a memory address of the extended register E5 and then stored in the extended register E1 and the value of the extended register E5 should be increased by "4" after the storage, thereby producing an associated control signal.

The contents of the extended register E5, associated with the physical address "0101", are read out as a source operand from the register file 120 and then stored in the E0 register 131.

Furthermore, the operation decoder 116 decodes the other unit as a loop instruction, thereby producing an associated control signal.

Responsive to the control signal supplied from the operation decoder 116, the value of the program counter 124 in the register file 120 is stored in the E2 register 134.

(c) EX Stage

The operation unit 133 reads out the data stored in the E0 register 131 and outputs the data to an address input section of the data memory 143 in response to the control signal supplied from the operation decoder 116. Also, the operation unit 133 adds "4" to the data read out, and stores the sum in the M0 register 141.

On the other hand, the operation unit 136 reads out the data stored in the E2 register 134 and stores the destination address of the loop in the M1 register 142 responsive to the control signal supplied from the operation decoder 116.

(d) MEM Stage

The data stored in the M0 register 141 is passed through the data memory 143 and then stored in the W0 register 151. Also, responsive to the control signal supplied from the operation decoder 116, data is read out from the data memory 143 at the specified memory address and then stored in the W0 register 151.

Also, the data stored in the M1 register 142 is passed through the data memory 143 and then stored in the W1 register 152.

(e) WB Stage

The data stored in the W0 register 151 is read out and then stored in the register file 120 at the destination address "0001" specified by the second register address extractor 114.

On the other hand, the data stored in the W1 register 152 is stored at the program counter 124 in the register file 120.

Among the instructions shown in FIG. 15, Instructions 3, 4, 5 and 6 are composed of four bytes, while Instructions 1 and 2 are composed of three bytes. That is to say, the total code size of the instructions shown in FIG. 15 is 22 bytes.

As can be understood, by executing some instructions in the third instruction format according to this embodiment, the code size can be reduced from 24 to 22 bytes. Also, by changing the instruction set shown in FIG. 14 into that shown in FIG. 15, the number of instructions can also be reduced from eight to six, thus improving the performance in executing the instructions.

It should be noted that the present invention is in no way limited to the data processor described in the foregoing embodiment. For example, although address and data registers are extended in the foregoing embodiment, general-purpose registers may be extended instead. Also, in the foregoing description, the respective numbers of address, data and extended registers are four, four and eight. Alternatively, any number of registers may be used for each of these types. Moreover, in the foregoing embodiment, the first register file 220 is specified in the first instruction format, while the second register file 120, including the first register file 220, is specified in the second instruction format. However, the present invention is not limited to such a specific embodiment. The number of registers included in the second register file may be larger than that of registers included in the first register file, and only the second register file may be specified in the second instruction format without specifying the first register file.

Furthermore, in accordance with the third instruction format, two units are supposed to be executed in parallel to each other in the foregoing embodiment. If necessary, it is naturally possible to execute three or more units in parallel to each other in accordance with the third instruction format.

What is claimed is:

1. A data processor, comprising:
an instruction memory configured to store a program;
an instruction fetch section configured to read out an instruction identified in a first instruction format or a second instruction format from the instruction memory;
an instruction decoder having an instruction-type identifier which receives an instruction identified in the first instruction format or the second instruction format, and determines whether an instruction format of the received instruction is described in the first instruction format or the second instruction format, and configured to decode the received instruction;
a register file having a plurality of address registers, a plurality of data registers, and a plurality of extended registers in which a register name and a register address are assigned from the instruction decoder;
a plurality of pipeline registers configured to store an output from the register file;
a plurality of operation units configured to execute arithmetic operations using data stored in the plurality of pipeline registers; and
a data memory configured to store arithmetic results by the plurality of operation units.

2. The data processor of claim 1,
two addresses described in the first instruction format and the second instruction format for specifying a same register included in the register file are different from each other.

3. The data processor of claim 2,
the instruction decoder includes a register address converter, and
the register address converter is configured to receive an instruction described in the first instruction format, and convert an address of one register included in the register file assigned by the instruction described in the first instruction format into an address described in the second instruction format.

* * * * *